(12) United States Patent
Moura et al.

(10) Patent No.: US 6,760,488 B1
(45) Date of Patent: Jul. 6, 2004

(54) SYSTEM AND METHOD FOR GENERATING A THREE-DIMENSIONAL MODEL FROM A TWO-DIMENSIONAL IMAGE SEQUENCE

(75) Inventors: Jose' M. F. Moura, Pittsburgh, PA (US); Pedro M. Q. Aguiar, Lisbon (PT)

(73) Assignee: Carnegie Mellon University, Pittsburgh, PA (US)

( * ) Notice: Subject to any disclaimer, the term of this patent is extended or adjusted under 35 U.S.C. 154(b) by 692 days.

(21) Appl. No.: 09/614,841

(22) Filed: Jul. 12, 2000

Related U.S. Application Data

(60) Provisional application No. 60/143,323, filed on Jul. 12, 1999.

(51) Int. Cl.$^7$ ................................................. G06K 9/36
(52) U.S. Cl. ...................................... 382/285; 345/419
(58) Field of Search ................................ 382/285, 260, 382/265, 266, 100; 345/419, 418; 348/135, 147

(56) References Cited

U.S. PATENT DOCUMENTS

| | | | |
|---|---|---|---|
| 5,475,422 A | * 12/1995 | Mori et al. | 348/48 |
| 5,579,401 A | * 11/1996 | Gear | 382/100 |
| 6,009,437 A | * 12/1999 | Jacobs | 707/102 |
| 6,137,491 A | * 10/2000 | Szeliski | 345/419 |

OTHER PUBLICATIONS

C. Tomasi and T. Kanade, "Shape and Motion from Image Streams under Orthography: A Factorization Method," *International Journal of Computer Vision*, vol. 9, No. 2, pp. 137–154, 1992.

R. Tsai and T. Huang, "Uniqueness and Estimation of Three–Dimensional Motion Parameters of Rigid Objects with Curved Surfaces," *IEEE Transactions on PAMI*, vol. 6, No. 1, Jan., 1984.

T. Broida and R. Chellappa, "Estimating the Kinematics and Structure of a Rigid Object form a Sequence of Monocular Images," *IEEE Transactions on PAMI*, vol. 13, No. 6, Jun., 1991.

R. Szelinski and S. Kang, "Recovering 3D Shape and Motion from Image Streams Using Nonlinear Least Squares," *Journal of Visual Communication and Image Representation*, vol. 5, No. 1, pp. 10–28, Mar., 1994.

S. Soatto, P. Perona, R. Frezza, and G. Picci, "Recursive Motion and Structure Estimation with Complete Error Characterization," *IEEE Conference on CVPR*, Jun. 1993, pp. 428–433.

J. Thomas, A. Hanson, and J. Oliensis, "Understanding Noise: The Critical Role of Motion Error in Scene Reconstruction," in *IEEE Int. Conference in Computer Vision*, 1993, pp. 325–329.

C. Poelman and T. Kanade, "A Paraperspective Factorization Method for Shape and Motion Recovery," *IEEE Trans. On Pattern Analysis and Machine Intelligence*, vol. 19, No. 3, Mar., 1997.

(List continued on next page.)

*Primary Examiner*—Yon J. Couso
(74) *Attorney, Agent, or Firm*—Kirkpatrick & Lockhart LLP

(57) ABSTRACT

A system for generating a three-dimensional model of an object from a two-dimensional image sequence. According to one embodiment, the system includes an image sensor for capturing a sequence of two-dimensional images of a scene, the scene including the object, a two-dimensional motion filter module in communication with the image sensor for determining from the sequence of images a plurality of two-dimensional motion parameters for the object, and a three-dimensional structure recovery module in communication with the two-dimensional motion filter module for estimating a set of three-dimensional shape parameters and a set of three-dimensional motion parameters from the set of two-dimensional motion parameters using a rank 1 factorization of a matrix.

52 Claims, 9 Drawing Sheets-

OTHER PUBLICATIONS

J. P. Costeira and T. Kanade, "A Multibody Factorization Method for Independently Moving Objects," *International Journal of Computer Vision,* 29(3), pp. 159–179, 1998.

J. R. Bergen, P. Anandan, K. J. Hanna, and R. Hingorani, "Hierarchical Model–Based Motion Estimation," in *European Conference on Computer Vision,* Italy, pp. 237–252, May 1992.

H. Zheng and S. D. Blostein, "Motion–Based Object Segmentaion and Estimation Using the MDL Principle," *IEEE Transactions on Image Processing,* vol. 4, No. 9, Sep., 1995.

S. Mann and R. Picard, "Video Orbits of the Projective Group: A Simple Approach to Featureless Estimation of Parameters," *IEEE Trans. On Image Processing,* vol. 6, No. 9, Sep., 1997.

M. Chang, A. Tekalp, and M. Sezan, "Simultaneous Motion Estimation and Segmentation," *IEEE Trans. On Image Processing,* vol. 6, No. 9, 1997.

R. S. Jasinschi and J.M.F. Moura, "Generative Video: A Meta Video Framework," submitted for publication Jun., 1996.

T. Morita and T. Kanade, "A Sequential Factorization Method for Recovering Shape and Motion From Image Streams," *IEEE Transactions on PAMI,* vol. 19, No. 8, Aug., 1997.

F.C.M. Martins and J.M.F. Moura, "Video Representation With Three–Dimensional Entities," *IEEE Journal on Selected Areas in Communications,* vol. 16, No. 1, Jan., 1998.

* cited by examiner

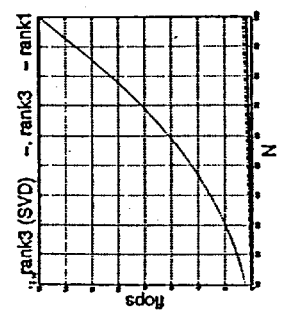
Fig. 13a
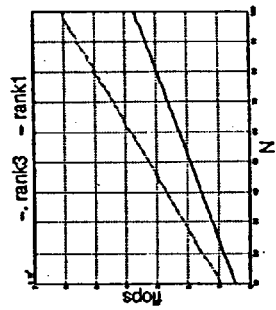
Fig. 13b
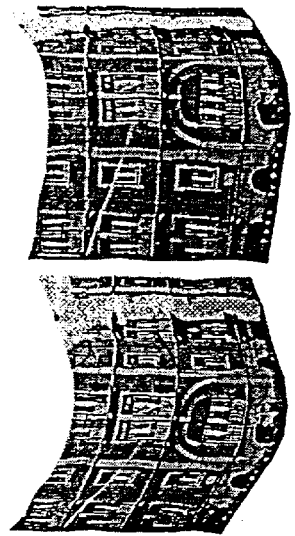
Fig. 15a
Fig. 15b
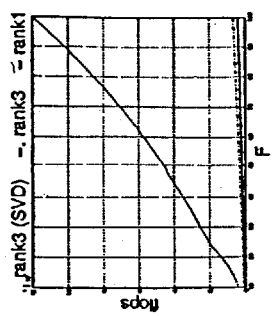
Fig. 12a
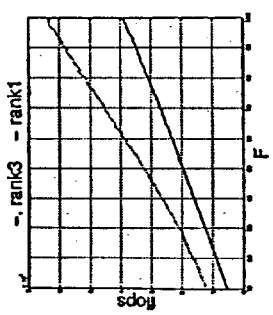
Fig. 12b
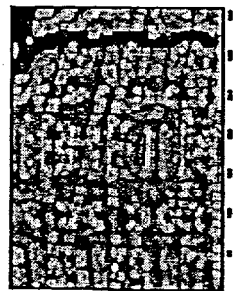
Fig. 14a
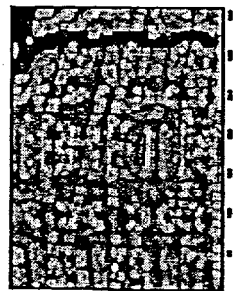
Fig. 14b

SYSTEM AND METHOD FOR GENERATING A THREE-DIMENSIONAL MODEL FROM A TWO-DIMENSIONAL IMAGE SEQUENCE

CROSS-REFERENCE TO RELATED APPLICATIONS

This application claims priority to U.S. provisional patent application Serial No. 60/143,323, filed Jul. 12, 1999.

STATEMENT REGARDING FEDERALLY SPONSORED RESEARCH AND DEVELOPMENT

Not Applicable.

BACKGROUND OF INVENTION

1. Field of Invention

The present invention relates generally to image and video processing and, more particularly, to systems and methods for generating three-dimensional models from two-dimensional image sequences.

2. Description of the Background

This invention concerns the automatic generation of a three-dimensional (3D) description of the real world environment. Target applications are found in several fields, including digital video, virtual reality, and robotics. In digital video, 3D models enable content-based representations suitable for powerful video editing and handling, video content addressing, very low bit rate compression, transmission of video over wireless and wireline links, and frame rate conversion. In virtual reality, 3D models of real world objects potentiate the merging of virtual and real entities and the virtual manipulation of real world objects. In robotics, the navigation of autonomous mobile vehicles in unknown environments demands the automatic generation of 3D models of the environment.

The problem of recovering the 3D structure (i.e., 3D shape and 3D motion) from a 2D video sequence has been widely considered by the computer vision community. Methods that infer 3D shape from a single frame are based on cues such as shading and defocus. These methods fail to give reliable 3D shape estimates for unconstrained real-world scenes. If no prior knowledge about the scene is available, the cue to estimating the 3D structure is the 2D motion of the brightness pattern in the image plane. For this reason, the problem is generally referred to as structure from motion. The two major steps in structure from motion are usually the following: compute the 2D motion in the image plane; and estimate the 3D shape and the 3D motion from the computed 2D motion.

Early approaches to structure from motion processed a single pair of consecutive frames and provided existence and uniqueness results to the problem of estimating 3D motion and absolute depth from the 2D motion in the camera plane between two frames. Two-frame based algorithms are highly sensitive to image noise, and, when the object is far from the camera, i.e., at a large distance when compared to object depth, they fail even at low level image noise. More recent research has been oriented towards the use of longer image sequences. These techniques require filtering algorithms that integrate along time a set of two-frame depth estimates. All of these approaches require the computationally-intensive task of computing an estimate of the absolute depth as an intermediate step.

According to one known technique which does not require computing of an estimate of the absolute depth as an intermediate step, the 3D positions of the feature points are expressed in terms of Cartesian coordinates in a world-centered coordinate system, and the images are modeled as orthographic projections. The 2D projection of each feature point is tracked along the image sequence. The 3D shape and motion are then estimated by factorizing a measurement matrix whose entries are the set of trajectories of the feature point projections. The factorization of the measurement matrix, which is rank 3 in a noiseless situation, is computed by using a Singular Value Decomposition (SVD) expansion technique.

When the goal is the recovery of a dense representation of the 3D shape, the SVD factorization approach may not solve the problem satisfactorily because of two drawbacks. First, being feature-based, it is necessary to track a large number of features to obtain a dense description of the 3D shape. This is usually impossible because only distinguished points, as brightness corners, can be accurately tracked. Second, even if it is possible to track a large number of features, the computational cost of the SVD involved in the factorization of the rank 3 measurement matrix would be very high. Thus, the decomposition and normalization stages involved in the factorization approach are complicated and the approach is more susceptible to noise.

Accordingly, there exists a need in the prior art for an efficient and less computationally-intensive technique to recover 3D structure from a 2D image sequence. There further exists a need for such a technique to be robust to noise. There further exists a need for such a technique to model occluded objects.

BRIEF SUMMARY OF THE INVENTION

The present invention is directed to a system for generating a three-dimensional model of an object from a two-dimensional image sequence. According to one embodiment, the system includes: an image sensor for capturing a sequence of two-dimensional images of a scene, the scene including the object; a two-dimensional motion filter module in communication with the image sensor for determining from the sequence of images a plurality of two-dimensional motion parameters for the object; and a three-dimensional structure recovery module in communication with the two-dimensional motion filter module for estimating a set of three-dimensional shape parameters and a set of three-dimensional motion parameters from the set of two-dimensional motion parameters using a rank 1 factorization of a matrix. The system may also include a three-dimensional shape refinement module to refine the estimate of the three-dimensional shape using a coarse-to-fine continuation-type method.

According to another embodiment, the present invention is directed to a method for generating a three-dimensional model of an object from a two-dimensional image sequence. The method includes: capturing a sequence of images of a scene, the scene including the object; determining a plurality of two-dimensional motion parameters for the object from the sequence of images; and estimating a set of three-dimensional shape parameters and a set of three-dimensional motion parameters from the two-dimensional motion parameters using a rank 1 factorization of a matrix. The method may also include refining the estimate of the three-dimensional shape using a coarse-to-fine continuation type method.

The present invention provides numerous advantages over prior approaches for determining structure from motion in a video sequence. For instance, in contrast to prior techniques which also estimate 3D shape directly instead of estimating the absolute depth as an intermediate step, the present invention does not rely on the tracking of pointwise features. Instead, the present invention uses a parametric description of the shape and the induced optical flow parameterization. This approach yields several advantages. First, the tracking of feature points may be unreliable when processing noisy video sequences. As a result, to alleviate this situation in the prior art, it is known to assume a very short interval between frames for easy tracking. In contrast, according to the present invention, the 3D shape and motion parameters may be estimated from a sequence of just a few flow parameters, avoiding the need to process a large set of feature trajectories. Second, the relation between the optical flow parameters and the 3D rotation and 3D shape parameters enables the recovery of the 3D structure according to the approach of the present invention by a rank 1 factorization a matrix, instead of a rank 3 matrix as in the prior art. Consequently, the decomposition and normalization stages involved in the factorization approach of the present invention are simpler and more robust to noise.

In addition, the approach of the present invention handles general shaped structures. It is well suited to the analysis of scenes with polyhedral surfaces. This is particularly relevant in outdoor modeling of buildings with flat walls, where the optical flow model reduces to the affine motion model. Further, the present invention provides an advantage over the prior art in that the surface-based 2D shape representations (i.e., the 3D shape) are not restricted to a sparse set of 3D points, but rather may be represented by, for example, planar patches. In addition, the factorization approach of the present invention permits the specification of different reliability weights to different 2D motion parameters, thus improving the quality of the 3D structure recovered without additional computational cost. Additionally, the present invention permits the 3D modeling of occluded objects.

These and other benefits of the present invention will be apparent from the detailed description hereinbelow.

DESCRIPTION OF THE DRAWINGS

For the present invention to be clearly understood and readily practiced, the present invention will be described in conjunction with the following figures, wherein:

FIGS. 12a–b and 13a–b are plots of the average number of floating point operations for three different methods for computing the 3D shape and 3D motion of an object;

FIG. 14a is an image of a building;

FIG. 14b is an image representing the trackability of the features candidates of the building of FIG. 14a;

FIGS. 15a–b are perspective views of the 3D shape of the building with the texture mapped on it recovered according to an embodiment of the present invention;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in a typical computer vision system. For example, specific operating system details and modules contained in the processor are not shown. Those of ordinary skill in the art will recognize that these and other elements may be desirable to produce a system incorporating the present invention. However, because such elements are well known in the art, and because they do not facilitate a better understanding of the present invention, a discussion of such elements is not provided herein.

Figure 1:
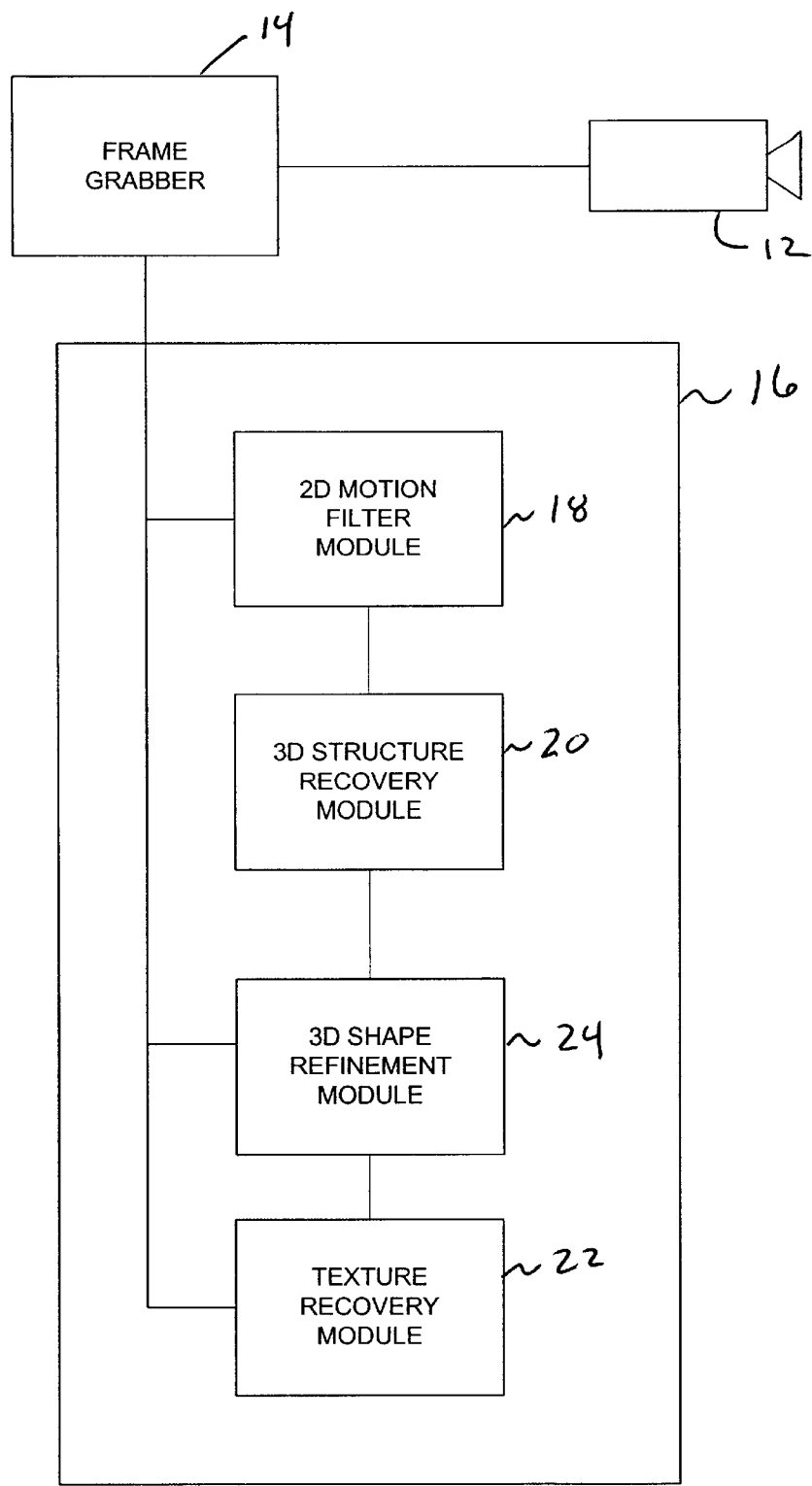
FIG. 1 is a block diagram of a vision system according to one embodiment of the present invention.

FIG. 1 is block diagram of a vision system 10 according to one embodiment of the present invention. The system 10 includes an image sensor 12, a frame grabber 14, and a processor 16. As discussed hereinbelow, the system 10 may be used to generate a three-dimensional (3D) model of an object (not shown) in the view of the image sensor 12.

The image sensor 12 may be, for example, any device capable of capturing images, such as video images, of an object in its field of view and may be embodied, for example, as a video camera, such as a Sony® XC-75 CCD camera, or a camcorder. The image sensor 12 may be, for example, a digital or analog camera. The frame grabber 14 is in communication with the image sensor 12 and may be any device capable of capturing and digitizing images captured by the image sensor 12. For an embodiment in which the image sensor 12 itself generates digital images, such as if the image sensor 12 is a digital camera, the frame grabber 14 is not necessary.

The processor 16 is in communication with the frame grabber 14 and may be implemented as, for example, a computer, such as a workstation or a personal computer, a microprocessor, or an application specific integrated circuit (ASIC). The processor 16 may include a number of modules, including a 2D motion filter module 18, a 3D structure recovery module 20, a texture recovery module 22, and a 3D shape refinement module 24. As described further hereinbelow, the filters 18, 20, 22, 24 receive digitized images of a video sequence captured by the image sensor 12 and successively process the original video sequence to extract from it 3D models for the background and moving objects that are present in the video sequence. The 3D models may include the 3D-shape, the 3D-motion, and the texture for the background and the moving objects present in the video sequence.

The modules 18, 20, 22, 24 may be implemented as code to be executed by the processor 16 using any type of computer instruction types such as, for example, microcode or software, using any suitable computer language, such as C or C++, using, for example, conventional or object-oriented techniques. The code may be stored as a series of instructions or commands on a computer readable medium, such as a random access memory (RAM), a read only memory (ROM), a magnetic medium such as a hard-drive or a floppy disk, or an optical medium such as a CD-ROM.

The 2D motion filter module 18 receives the digitized images of the video sequence from the frame grabber 14. The 2D motion filter module 18 may detect the motion induced in the video sequence by motion of the image sensor 12 and any moving objects in the video sequence to determine the motion of the background and the motion of the objects. The 2D motion filter module 18 may generate the parameters used in parametric models to describe these motions, as described further hereinbelow. Examples of these parameters are the translational, rotational, and scaling parameters used by 2D affine models to describe the motions detected in the video sequences. Any technique for generating the parameters used in the parametric models may be used such as, for example, the technique described in Bergen et al., "Hierarchical model-based motion estimation", in *European Conference on Computer Vision*, Italy, May 1992, pp. 237–52, which is incorporated herein by reference.

The 3D structure recovery module 20 processes the 2D motion parameters that are filtered by the 2D motion filter module 18 from the video sequence to recover 3D-motion information and 3D-shape information. As described further hereinbelow, the 3D structure recovery module 20 may recover the 3D structure of an object in the image sequence by first computing a maximum likelihood (ML) estimate for the following unknowns: the parameters describing the 3D motion, the object shape, and the object texture. These estimates are determined from a set of images, rather than a single pair. This provides accurate estimates for the 3D structure due to the 3D rigidity of the scene. The formulation of the ML estimate from a set of frames leads to the minimization of a complex cost function. To minimize the ML cost function, the object texture terms are solved for in terms of the 3D shape and 3D motion parameters. After replacing the texture estimate, the minimization of the ML cost function with respect to the 3D shape and 3D motion parameters remains.

The 3D shape recovery module 20 may then compute the 3D motion parameters using a rank 1 factorization (factorization of a matrix having one linearly dependent row or column). After computing the 3D motion parameters, only the minimization of the ML cost function with respect to the 3D shape remains. According to one embodiment of the present invention, this non-linear minimization may be solved by estimating coarse approximations to the 3D shape.

The 3D shape refinement module 24, as described further hereinbelow, may then refine the estimates of the 3D shape based on the computed 3D motion parameters by taking into account more digitized images of the scene according to a continuation-type multiresolution approach. Such an approach may iteratively approximate a solution for the 3D shape. The 3D shape refinement module 24 may employ a Gaussian-Newton method, thus making each iterative step in the approach computationally simple because only the computation of large gradients is required. Accordingly, dense estimates of the 3D shape may be recovered.

The texture recovery module 22 may recover the texture information of the object from the image sequence by solving the ML cost function based on the 3D shape and the 3D motion previously determined. According to one embodiment, the texture recovery module 22 may solve the ML cost function based on the 3D shape information recovered by the 3D structure recovery module 20 or, according to another embodiment, the texture recovery module 22 may solve the ML cost function based on the 3D shape information recovered by the 3D shape refinement module 24.

Although the vision system 10 of the present invention is described herein as including an image sensor 12 to generate the images of the scene, according to other embodiments of the present invention, the image sensor 12 is not necessary. For example, a sequence of digitized images may be transmitted to the 2D motion filter module 18 from a storage unit such as, for example, a computer readable medium, such as a random access memory (RAM), a read only memory (ROM), a magnetic medium such as a hard-drive or a floppy disk, or an optical medium such as a CD-ROM. Additionally, the image sequence may be transmitted to the 2D motion filter module 18 over, for example, a wireless or wireline communication link.

The process of recovering the 3D structure (i.e., 3D shape and 3D motion) from the 2D video sequence captured by the image sensor 12 will now be described according to one embodiment of the present invention. Consider a rigid object O moving in front of the image sensor 12. The position and orientation of O relative to the image sensor coordinate system at time instant f may be represented by $m_f = \{t_{uf}, t_{vf}, t_{wf}, \theta_f, \psi_f, \phi_f\}$, where $(t_{uf}, t_{vf}, t_{wf})$ are the coordinates of the origin of the object coordinate system with respect to the image sensor coordinate system (3D translation), and $(\theta_f, \phi_f, \psi_f)$ are the Euler angles that determine the orientation of the object coordinate system relative to the image sensor coordinate system (3D motion).

The frame $I_f$ captured at time f, $1 \leq f \leq F$, may be modeled as a noisy observation of the projection of the object:

$$I_f = P(O, m_f) + W_f \qquad (1)$$

It may be assumed that the object has been segmented, and that P is the orthogonal projection operator. For simplicity, the observation noise $W_f$ may be assumed to be zero mean, white, and Gaussian.

The object O is described by its 3D shape S and texture T. The shape S may be modeled by a parametric description S(a) of the surface of the object, where the vector a is unknown. The texture T represents the light received by the image sensor 12 after reflecting on the object surface, i.e., the texture T is the object brightness as perceived by the image sensor 12. The texture depends on the object surface photometric properties, as well as on the environment illumination conditions. It may be assumed that the texture does not change with time.

The operator P returns the texture T as a real valued function defined over the image plane. This function is a nonlinear mapping that depends on the object shape S and the object position $m_f$. The intensity level of the projection of the object at pixel u on the image plane is:

$$P(O, m_f)(u) = T(s_f(S, m_f; u)) \qquad (2)$$

where $s_f(S, m_f; u)$ is the nonlinear mapping that lifts the point u on the image $I_f$ to the corresponding point on the 3D object surface. This mapping $s_f(S,m_f;u)$ is determined by the object shape $S(a)$ and the position $m_f$. To simplify the notation, only the dependence on f, i.e., $s_f(u)$, is written explicitly hereinafter.

Figure 2:
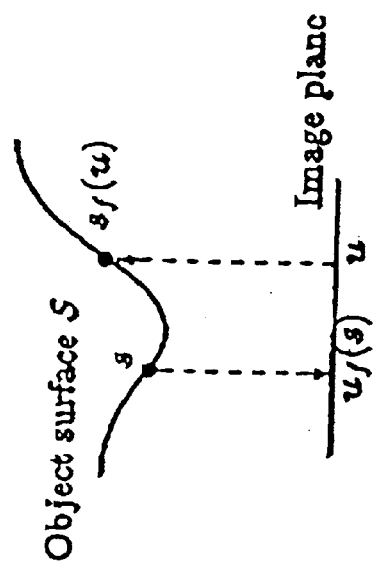
FIG. 2 illustrates the mappings for $u_f(s)$ and $s_f(u)$ for an object surface S on the image plane.

FIG. 2 illustrates the lifting mapping $s_f(u)$ and the direct mapping $u_f(s)$ for the orthogonal projection of a two-dimensional object. The inverse mapping $u_f(s)$ also depends on S and $m_f$, but, again, the dependence on f will only be explicitly shown hereinafter for purposes of simplicity. On the left of FIG. 2, the point s on the surface of the object projects onto $u_f(s)$ on the image plane. On the right, pixel u on the image plane is lifted to $s_f(u)$ on the object surface. According to one embodiment, it may be assumed that the object does not occlude itself, i.e., $u_f(s_f(u))=u$ and $s_f(u_f)(s))=s$. According to another embodiment, as discussed further hereinbelow with respect to FIG. 16, the present invention may be extended to accommodate the possibility of occlusions. The mapping $u_f(s)$, seen as a function of the frame index f, for a particular surface point s, is the trajectory of the projection of that point in the image plane, i.e., it is the motion induced in the image plane, usually referred to as opticalflow. Hereinafter, the map $u_f(s)$ is referred to as the optical flow map.

The observation model (1) may be rewritten by using (2) as:

$$I_f(u)=T(s_f(u))+W_f(u). \qquad (3)$$

Now, the estimation of the 3D shape $S(a)$ and the 3D motion $\{m_f, 1 \leq f \leq F\}$ of the object O given the video sequence $\{I_f, 1 \leq f \leq F\}$ of F frames is considered.

Given this observation model, the 3D shape recovery module 20 may recover the 3D shape and the 3D motion of the object O from the video sequence $\{I_f, 1 \leq f \leq F\}$ by estimating all the unknowns: the 3D shape vector a; the texture T; and the set of 3D positions of the object $\{m_f, 1 \leq f \leq F\}$ with respect to the image sensor 12. According to one embodiment, the 3D shape recovery module 20 may use a maximum likelihood (ML) estimation to estimate these unknowns. When the noise sequence $\{W_f(u)\}$ is zero mean, spatially and temporally white, and Gaussian, the ML estimate minimizes the sum over all the frames of the integral over the image plane of the squared errors between the observations and the model:

$$C_{ML}(a, T, \{m_f\}) = \sum_{f=1}^{F} \int [I_f(u) - T(s_f(u))]^2 du \qquad (4)$$

$$\{\hat{a}, \hat{T}, \{\hat{m}_f\}\} = \arg\min_{a,T,\{m_f\}} C_{ML}(a, T, \{m_f\}) \qquad (5)$$

(A continuous spatial dependence for commodity may be used. The variables u and s are continuous while f is discrete.) In (4), the dependence of the cost function $C_{ML}$ on the object texture T is explicit. Note that $C_{ML}$ depends on the object shape $S(a)$ and the object positions $\{m_f\}$ through the mappings $\{s_f(u)\}$.

The minimization of $C_{ML}(a, T, \{m_f\})$ may be addressed by first solving for the texture estimate $\hat{T}$ in terms of the 3D object shape $S(a)$ and the object positions $\{m_f\}$. According to one embodiment, to recover the texture of the objects, the cost function $C_{ML}$ given by (4) may be rewritten by changing the integration variable from the image plane coordinate u to the object surface coordinate s, thus obtaining:

$$C_{ML}(a, T, \{m_f\}) = \sum_{f=1}^{F} \int [I_f(u_f(s)) - T(s)]^2 J_f(s) ds \qquad (6)$$

where $u_f(s)$ is the optical flow mapping introduced hereinbefore that projects the point s on the object surface onto the image plane at instant f (see FIG. 2). The function $J_f(s)$ is the Jacobian of the mapping $u_f(s), J_f(s) = |\nabla u_f(s)|$.

Expression (6) shows that the cost function $C_{ML}$ is quadratic in each intensity value $T(s)$ of the object texture. The ML estimate $\hat{T}(s)$ is:

$$\hat{T}(s) = \frac{\sum_{f=1}^{F} I_f(u_f(s)) J_f(s)}{\sum_{f=1}^{F} J_f(s)} \qquad (7)$$

Expression (7) provides that the estimate of the texture of the object at the surface point s is a weighted average of the measures of the intensity level corresponding to that surface point. A given region around s on the object surface projects at frame $I_f$ to a region around $u_f(s)$. The size of this projected region changes with time because of the object motion. The more parallel to the image plane is the tangent to the object surface at point s, the larger is the size of the projected region. Expression (7) shows that the larger the Jacobian $J_f(s)$ is, i.e., the larger the region around s is magnified at frame $I_f$, the larger the weight given to that frame when estimating the texture $T(s)$.

By inserting the texture estimate $\hat{T}$ given by (7) in (6), the cost function $C_{ML}$ may be expressed in terms of the optical flow mappings $\{u_f(s)\}$. After manipulations, the following may be obtained:

$$C_{ML}(a, \{m_f\}) = \sum_{f=2}^{F} \sum_{g=1}^{f-1} \int [I_f(u_f(s)) - I_g(u_g(s))]^2 \frac{J_f(s) J_g(s)}{\sum_{h=1}^{F} J_h(s)} ds \qquad (8)$$

The cost function $C_{ML}$ given by (8) is a weighted sum of the squared differences between all pairs of frames. At each surface point s, the frame pair $\{I_f, I_g\}$ is weighted by $$\frac{J_f(s) J_g(s)}{\sum_{h=1}^{F} J_h(s)}.$$

The larger this weight is, i.e., the larger a region around s is magnified in frames $I_f$ and $I_g$, the more the square difference between $I_f$ and $I_g$ affects $C_{ML}$.

Expression (8) also makes clear why the problem addressed is referred to as structure from motion: having eliminated the dependence on the texture, a cost function remains that depends on the structure (3D shape $S(a)$ and 3D motion $\{m_f\}$) only through the motion induced in the image plane, i.e., through the optical flow mappings $\{u_f(s)\}$. Recall that, as described hereinbefore, $u_f(S, m_f; s)$ depends on the shape S and the motion $m_f$.

To recover the 3D shape and the 3D motion of the object O from the image sequence $\{I_f, 1 \leq f \leq F\}$, the 3D shape recovery module 20 need not attempt the direct minimization of the cost function $C_{ML}$, given by (8), over the parameters a and $\{m_f\}$. Rather, 3D shape recovery module 20 may exploit the constraints induced on the optical flow by the orthogonality of the projection P, the rigidity of the motions (rigid object), and the parameterization of the surface shape of the object. The constraints induced on the optical flow enable the 3D shape recovery module 20 of the present invention to parameterize the optical flow mapping $u_f(s)$ in terms of a parameter vector $\alpha_f$ as $u(\alpha_f;s)$, $1 \leq f \leq F$. The parameter vector $\alpha_f$ is directly related to the 3D shape parameter a and the 3D position $m_f$, as will be shown below.

Before addressing the general case (i.e., 3D), it may be beneficial to illustrate an approach of the present invention with a simple example: a parabolic patch moving in a 2D world where the images are 1D orthogonal projections. This scenario, although simpler than the 3D world problem, reflects the very basic properties and difficulties of the structure from motion paradigm. Note that the 2D scenario, illustrated in FIG. 3, corresponds to the real 3D world if only one epipolar plane is considered and it is assumed that the motion occurs on that plane. The images are single scanlines.

Figure 3:
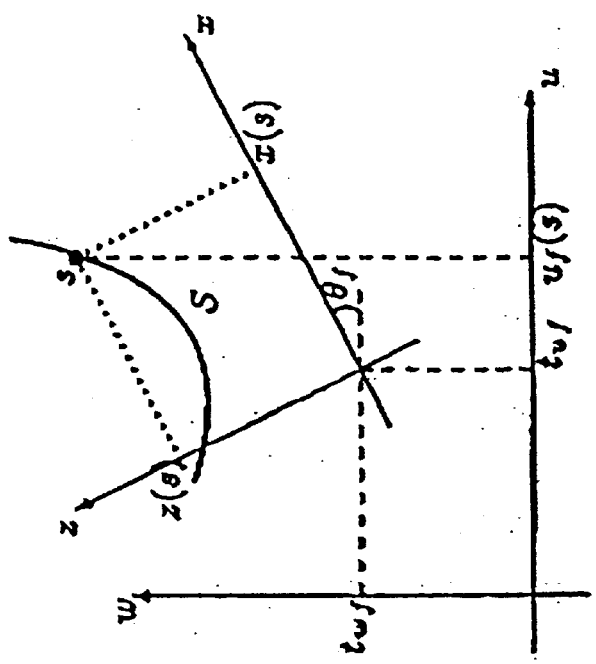
FIG. 3 illustrates the object and image sensor coordinate systems in a 2D scenario.

FIG. 3 shows a parabolic patch S that moves with respect to a fixed image sensor 12. A coordinate system may be attached to the object S given by the axes labeled x and z. The 2D object shape $S(a)$ may be described in terms of the vector $a = [a_0, a_1, a_2]^T$, in the object coordinate system, by the parabola:

$$z(x) = z(a;x) = a_0 + a_1 x + a_2 x^2 \qquad (9)$$

To capture the motion of the object, a different coordinate system may be attached to the image sensor 12 given by the axes u and w. The u axis is the image sensor "plane". The 2D motion of the object may be defined by specifying the position of the object coordinate system relative to the image sensor coordinate system. Hence, the object position at time instantfis expressed in terms of $(t_{uf}, t_{wf}, \theta_f)$ where $(t_{uf}, t_{wf})$ are chosen to be the coordinates of the origin of the object coordinate system with respect to the image sensor coordinate system (translational component of the 2D motion), and $\theta_f$ is the orientation of the object coordinate system relative to the image sensor coordinate system (rotational component of the motion).

At instant f, the point on the object with 2D coordinates $(x,z)$ in the object coordinate system has the following coordinates in the image sensor coordinate system:

$$\begin{bmatrix} u_f \\ w_f \end{bmatrix} = R \begin{bmatrix} x \\ z \end{bmatrix} + t = \begin{bmatrix} i_{xf} & i_{zf} \\ k_{xf} & k_{zf} \end{bmatrix} \begin{bmatrix} x \\ z \end{bmatrix} + \begin{bmatrix} t_{uf} \\ t_{wf} \end{bmatrix} \qquad (10)$$

where R is the rotation matrix and t is the translation. The elements of the rotation matrix R are $i_{xf} = \cos\theta_f$, $i_{zf} = -\sin\theta_f$, $k_{xf} = \sin\theta_f$, $k_{zf} = \cos\theta_f$, where $\theta_f$ is the angle indicated in FIG. 3. From (10), it can be seen that the point $(x, z)$ projects at time f on the image coordinate $u_f$ given by:

$$u_f = i_{xf} x + i_{zf} z + t_{uf} \qquad (11)$$

Expression (11) shows that the orthogonal projection is insensitive to the translation component $t_{wf}$ of the object motion. This reflects the well known fact that, under orthography, the absolute depth (distance from the image sensor 12 to the object) cannot be estimated. Only the set of positions $\{m_f = \{t_{uf}, \theta_f\}, 1 \leq f \leq F\}$ can be estimated from the image sequence.

It is now described how the optical flow mappings $\{u_f(s)\}$ may described parametrically. Choose the coordinate s, labeling the argument of the texture function T, and representing in a unique way the generic point on the object surface (object contour in this case), to be the object coordinate x. For lack of a better name, s is referred to as the texture coordinate. A point with texture coordinate s on the object surface projects on image $I_f$, according to (11), to:

$$u_f(s) = i_{xf} x(s) + i_{zf} z(s) + t_{uf} = i_{xf} s + i_{zf}(a_0 + a_1 s + a_2 s^2) + t_{uf} \qquad (12)$$

where $x(s)$ and $z(s)$ are the coordinates of the point s in the object coordinate system. The equality $x(s) = s$ comes from the choice of the texture coordinate s, and the expression for $z(s)$ comes from the parabolic shape (9). By defining the coefficients of the powers of s in (12) as:

$$1 \leq f \leq F;\ \alpha_{f0} = i_{zf} a_0 + t_{uf},\ \alpha_{f1} = i_{xf} + i_{zf} a_1,\ \text{and}\ \alpha_{f2} = i_{zf} a_2 \qquad (13)$$

the following parametric description for the optical flow mapping $u_f(s)$ in terms of the parameter vector $\alpha_f = [\alpha_{f0}, \alpha_{f1}, \alpha_{f2}]^T$ may be obtained:

$$1 \leq f \leq F;\ u_f(s) = u(\alpha_f;s) = \alpha_{f0} + \alpha_{f1} s + \alpha_{f2} s^2 \qquad (14)$$

With the parabolic patch, the steps to recover the 2D structure, i.e., the shape parameters $\{a_0, a_1, a_2\}$ and the set of positions $\{t_{uf}, \theta_f, 1 \leq f \leq F\}$ may be summarized as:

i) Given the image sequence $\{I_f, 1 \leq f \leq F\}$, estimate the set of 2D motion parameters $\{\alpha_{f0}, \alpha_{f1}, \alpha_{f2}, 1 \leq f \leq F\}$. This leads to 3F estimates $\{\hat\alpha_{f0}, \hat\alpha_{f1}, \hat\alpha_{f2}, 1 \leq f \leq F\}$.

ii) Invert the relations (13), solving for the shape parameters $\{a_0, a_1, a_2\}$ and the 2F object positions $\{t_{uf}, \theta_f, 1 \leq f \leq F\}$, given the sequence of 3F estimates $\{\hat\alpha_{f0}, \hat\alpha_{f1}, \hat\alpha_{f2}, 1 \leq f \leq F\}$.

Returning to the 3D problem, the parametric description for the optical flow mapping $u_f(s) = u(\alpha_f;s)$ induced by the parametric shape description $S(a)$ and the rigid object position $m_f$, as introduced above and detailed for the 2D case in the previous example, is now considered. The 2D motion parameter vector $\alpha_f$ is a function of the 3D shape parameter vector a and of the object position $m_f$, i.e., $\alpha_f = \alpha_f(a, m_f)$. The 3D shape $S(a)$ and the 3D positions $\{m_f\}$ may be estimated by extending the methodology introduced in the previous example:

i) Given the image sequence $\{I_f, 1 \leq f \leq F\}$, estimate the set of time varying 2D motion vectors $\{\alpha_f, 1 \leq f \leq F\}$ parameterizing the optical flow mappings $\{u(\alpha_f;s)\}$.

ii) From the sequence of estimates $\{\hat\alpha_f, 1 \leq f \leq F\}$, solve for the shape parameter vector a and the object positions $\{m_f, 1 \leq f \leq F\}$.

The ML estimation of $\{\alpha_f, 1 \leq f \leq F\}$ in stage i) leads to the minimization of $C_{ML}$ given by (8) with respect to the set of vectors $\{\alpha_f, 1 \leq f \leq F\}$ parameterizing the mappings $\{u_f(s) = u(\alpha_f;s)\}$. In practice, this is a highly complex task. Therefore, for a more feasible and practical solution, the 3D structure recovery module 20 may decouple the estimation of each vector $\alpha_f$ from the estimation of the remaining vectors $\alpha_g$, $g \neq f$. Such an embodiment simplifies the cost function (8). Instead of using all possible pairs of frames, all frames may be compared with respect to a reference frame, for example, the first frame $I_1$. Also, the weighting term $$\frac{J_f(S) J_g(S)}{\sum_{h=1}^f J_h(S)}$$

may be neglected. In addition, the object coordinate system may be chosen to coincide with the image sensor coordinate system in the first frame $I_1$. As in the 2D example above, the texture coordinate s of the texture function T may be chosen to coincide with the horizontal coordinate in the object coordinate system. The optical flow mapping $u_1$ is then the identity mapping, $\mu_1(s)=s$. The estimate $\hat{\alpha}_f$ of the parameter vector $\alpha_f$ for $f=2, 3, \ldots, F$ is given by:

$$\hat{\alpha}_f = \underset{\alpha_f}{\arg\min} \int [I_f(u(\alpha_f; s)) - I_1(s)]^2 ds. \quad (15)$$

The 2D motion parameter vector $\alpha_f$ that minimizes (15) may be estimated, with known numerical techniques, such as, for example, the technique described in Bergen et al., "Hierarchical model-based motion estimation", in *European Conference on Computer Vision*, Italy, May 1992, pp. 237–52.

The 3D structure recovery module 20 may recover the 3D structure from 2D motion parameter matrix using a Least Squares (LS) fitting technique. Solving for the object shape parameter vector a and the object positions $\{m_f\}$, given the estimates $\{\hat{\alpha}_f\}$ of the 2D motion vectors (step ii above), is an overconstrained problem. An LS technique may be used to estimate a and $\{m_f\}$. If $\alpha_f(a,m_f)$ is the 2D motion parameter vector induced by the shape $S(a)$ and the position $m_f$, the estimates â and $\{\hat{m}_f\}$ are given by:

$$\{\hat{a}, \{\hat{m}_f\}\} = \underset{a,\{m_f\}}{\arg\min} \sum_{f=1}^{F} [\hat{\alpha}_f - \alpha_f(a, m_f)]^T [\hat{\alpha}_f - \alpha_f(a, m_f)] \quad (16)$$

The LS minimization above is in general nonlinear. First, a closed-form solution may be obtained for the estimate of the 3D translation. Then, due to the structure of the orthogonal projection operator, and the shape parameterization, the dependence of $\alpha_f = \alpha_f(a,m_f)$ for $1 \leq f \leq F$ on the vectors a and $m_f$ may be expressed in a bilinear matrix format as $R=MS^T$, where the matrix R collects the 2D motion parameters $\{\alpha_f, 1 \leq f \leq F\}$, M collects the positions $\{m_f, 1 \leq f \leq F\}$, and S contains the shape parameter a. The problem of estimating a and $\{m_f, 1 \leq f \leq F\}$ becomes how to find suitable factors M and $S^T$ for the factorization of the matrix R. This problem may be referred to as a factorization-like problem. As discussed herein, due to the structure of the bilinear relation, an initial approximate solution can be found by computing only the first singular vector of a modified version $\tilde{R}$ of the matrix R. A two-step iterative method may then be used to refine the 3D parameters.

The general methodology of the present invention may be used for any parametric shape description, including situations characterized by no prior knowledge about the object shape. For this kind of situations, a general shape model may be characterized by a local parameterization. The local shape parameterization induces a local parameterization for the optical flow.

According to one embodiment of the present invention, piecewise polynomial functions may be used to generate a generic shape model locally parameterized. The scenario considered here extends to 2D projections of a 3D world the concepts introduced previously. The coordinate system attached to the object is given by the axes labeled by x, y, and z. The shape S of the rigid object is a parametric description of the object surface. The objects may be considered to have a shape given by a piecewise polynomial with K patches. The 3D shape may be described in terms of K sets of parameters $\{a_{00}^n, a_{10}^n, a_{01}^n, a_{11}^n, a_{20}^n, a_{02}^n, \ldots\}$, for $1 \leq n \leq K$, where $$z = a_{00}^n + a_{10}^n(x - x_0^n) + a_{01}^n(y - y_0^n) + \quad (17)$$
$$a_{11}^n(x - x_0^n)(y - y_0^n) + a_{20}^n(x - x_0^n)^2 + a_{02}^n(y - y_0^n)^2 + \ldots$$

describes the shape of the patch n in the object coordinate system. With respect to the representation of the polynomial patches, the parameter $x_0^n$ and $y_0^n$ can have any value such as, for example, zero. The specification of general parameters $x_0^n$, $y_0^n$ is allowed because the shape of a small patch n with support region $\{(x,y)\}$ located far from the point $(x_0^n, y_0^n)$ has a high sensitivity with respect to the shape parameters. To minimize this sensitivity, $(x_0^n, y_0^n)$ may be chosen for the centroid of the support region of patch n. With this choice, the accuracy of the 3D structure recovery algorithm may be improved. By making $(x_0^n, y_0^n)$ to be the centroid of the support region of patch n, the numerical stability of the algorithm that estimates the 2D motion in he image plane is also improved.

Expression (17) describes the 3D shape with full generality in a local way—it is the Taylor series expansion of the relative depth $z(x,y)$ around the point $(x,y)=(x_0^n, y_0^n)$ for appropriate values of the set of shape parameters $\{a_{00}^n, a_{10}^n, a_{01}^n, a_{11}^n, a_{20}^n, a_{02}^n, \ldots\}$. The feature-based shape description from the from the general 3D shape described by expression (17) may be recovered by making zero all the shape parameters, except for $a_{00}^n$ that codes the relative depth of the feature $n, z=a_{00}^n$. Expression (17) models also a special case of practical interest: the piecewise planar shapes. In this case, the planar patch n may be described by the parameters $\{a_{00}^n, a_{10}^n, a_{01}^n\}$. This set of parameters codes the orientation of the planar patch, as well as its position.

To capture the 3D motion of the rigid object, a coordinate system may be attached to the image sensor given by the axes u, v, and w. The plane defined by the axes u and v is the image sensor plane. The 3D motion of the object may be defined by specifying the position of the object coordinate system $\{x,y,z\}$ relative to the camera coordinate system $\{u,v,w\}$. The unconstrained 3D motion of a rigid body may be described in terms of a time varying point translation and a rotation. The object position may be expressed at time instant f in terms of $(t_{uf}, t_{vf}, t_{wf}, \theta_f, \phi_f, \psi_f)$, where $(t_{uf}, t_{vf}, t_{wf})$ are the coordinates of the origin of the object coordinate system with respect to the image sensor coordinate system (translational component of the 3D motion), and $(\theta_f, \phi_f, \psi_f)$ are the Euler angles that determine the orientation of the object coordinate system relative to the camera coordinate system (rotational component of the 3D motion). At instant f, the point on the object with 3D coordinates $(x,y,z)$ in the object coordinate system has the following coordinates in the image sensor coordinate system:

$$\begin{bmatrix} u_f \\ v_f \\ w_f \end{bmatrix} = R \begin{bmatrix} x \\ y \\ z \end{bmatrix} + t = \begin{bmatrix} i_{xf} & i_{yf} & i_{zf} \\ j_{xf} & j_{yf} & j_{zf} \\ k_{xf} & k_{yf} & k_{zf} \end{bmatrix} \begin{bmatrix} x \\ y \\ z \end{bmatrix} + \begin{bmatrix} t_{uf} \\ t_{vf} \\ t_{wf} \end{bmatrix} \quad (18)$$

where the rotation matrix R is expressed in terms of the angles $\theta$, $\phi$, and $\psi$ as:

$$\begin{bmatrix} i_x & i_y & i_z \\ j_x & j_y & j_z \\ k_x & k_y & k_z \end{bmatrix} = \qquad (19)$$

$$\begin{bmatrix} \cos\theta\cos\phi & \sin\phi & -\sin\theta\cos\phi \\ \sin\theta\sin\psi - \cos\theta\sin\phi\cos\psi & \cos\phi\cos\psi & \sin\theta\sin\phi\cos\psi + \cos\theta\sin\psi \\ \sin\theta\cos\psi + \cos\theta\sin\phi\sin\psi & -\cos\phi\sin\psi & \cos\theta\cos\psi - \sin\theta\sin\phi\sin\psi \end{bmatrix}$$

From (18), it is noted that the point $x=[x,y,z]^T$ projects at time instant f on the image coordinates $u_f=[u_f,v_f]^T$ given by:

$$u_f = \begin{bmatrix} i_{xf} & i_{yf} & i_{zf} \\ j_{xf} & j_{yf} & j_{zf} \end{bmatrix} x + \begin{bmatrix} t_{uf} \\ t_{vf} \end{bmatrix} \qquad (20)$$

Expression (20) shows that the orthogonal projection is insensitive to the translation along the w axis. Only the set of positions $\{m_f=\{t_{uf},t_{vf},\theta_f,\phi_f,\psi_f\}, 1 \leq f \leq F\}$ can be estimated from the image sequence.

The optical flow mappings $\{u_f(s)\}$ may be described parametrically. For example, the coordinate $s=[s,r]^T$ of the generic point in the object surface may be chosen to coincide with the coordinates $[x,y]^T$ of the object coordinate system. Also, the object coordinate system may be chosen so that it coincides with the image sensor coordinate system in the first frame. A point with coordinate $s=[s,r]^T$ in the object surface is projected on coordinate $u=[x,y]^T=[s,r]^T=s$ in the first frame, so that $u_1(s)=s$. At instant f, that point is projected according to (20). For a point s that falls in patch k of the object surface, the following is obtained:

$$u_f(s) = \begin{bmatrix} i_{xf} & i_{yf} & i_{zf} \\ j_{xf} & j_{yf} & j_{zf} \end{bmatrix} x(s) + \begin{bmatrix} t_{uf} \\ t_{vf} \end{bmatrix} = \qquad (21)$$

$$\begin{bmatrix} i_{xf} & i_{yf} & i_{zf} \\ j_{xf} & j_{yf} & j_{zf} \end{bmatrix} \begin{bmatrix} s \\ r \\ \sum_{m,n=0}^{N} a_{mn}^k s^m r^n \end{bmatrix} + \begin{bmatrix} t_{uf} \\ t_{vf} \end{bmatrix}$$

where $x(s)=[x(s),y(s),z(s)]^T$ are the coordinates of the point s in the object coordinate system. The equalities $x(s)=x$ and $y(s)=y$ come from the choice of the texture coordinate s, and the expression for $z(s)$ comes from the polynomial shape (17) for the surface patch k. For the general case, see Aguiar, "Rigid Structure from Video," Ph.D. Thesis, Instituto Superior Tecnico, Lisbon, Portugal, January 2000, which is incorporated herein by reference.

The set of parameters $\{a_{fmn}^{uk}, a_{fmn}^{vk}, 1 \leq k \leq K, 1 \leq m,n \leq N\}$ may be defined as the coefficients of the powers of s and r in (21):

$$a_{f00}^{uk}=t_{uf}+i_{zf}a_{00}^{k}, a_{f10}^{uk}=i_{xf}+i_{zf}a_{10}^{k}, a_{f01}^{uk}=i_{yf}+i_{zf}a_{01}^{k}, a_{fmn}^{uk}=i_{zf}a_{mn}^{k},$$
$$1 \leq m,n \leq N \qquad (22)$$

$$a_{f00}^{vk}=t_{vf}+j_{zf}a_{00}^{k}, a_{f10}^{vk}=j_{xf}+j_{zf}a_{10}^{k}, a_{f01}^{vk}=j_{yf}+j_{zf}a_{01}^{k}, a_{fmn}^{vk}=j_{zf}a_{mn}^{k},$$
$$1 \leq m,n \leq N \qquad (23)$$

The optical flow between the frames $I_1$ and $I_f$ in the region corresponding to surface patch k may be expressed in terms of the 2D motion parameters $a_f^k = \{a_{fmn}^{uk}, a_{fmn}^{vk}\}$ as:

$$u_f(s) = u(a_f^k; s, r) = \begin{bmatrix} \sum_{m,n=0}^{N} a_{fmn}^{uk} s^m r^n \\ \sum_{m,n=0}^{N} a_{fmn}^{vk} s^m r^n \end{bmatrix} \qquad (24)$$

Note that for planar patches ($z=a_{00}^k+a_{10}^k x+a_{01}^k y$), the affine motion model ($u_f(s,r)=a_{f00}^{uk}+a_{f10}^{uk}s+a_{f01}^{uk}r$, and $v_f(s,r)=a_{f00}^{vk}+a_{f10}^{vk}s+a_{f01}^{vk}r$) may be obtained.

Known techniques, as described hereinbefore, may be used to estimate the 2D motion parameters. The integral in (15) may split into subintegrals over the regions corresponding to each shape segment. For each frame f=2, ... ,F, the following is obtained:

$$\{\hat{a}_{ufk}^{mn}, \hat{a}_{vfk}^{mn}, \hat{R}_k\} = \qquad (25)$$

$$\arg \min \sum_{k=1}^{K} \int\int R_k \left[ I_f\left(\sum_{m,n=0}^{N} a_{fmn}^{uk} s^m r^n, \sum_{m,n=0}^{N} a_{fmn}^{vk} s^m r^n\right) - I_1(s,r) \right] ds dr$$

where $R_k$ is the support region corresponding to the polynomial segment k. Note that, because the object coordinate system coincides with the image sensor coordinate system in the first frame, the polynomial segment k is projected on frame 1 into region $R_k$. Any method that segments and estimates the 2D motion parameters may be used.

According to another embodiment, the support regions $R_k$ may be selected a priori. Such an embodiment decouples the estimation of the 2D motion parameters corresponding to different regions. In fact, the framework of the present invention is general enough to accommodate the feature tracking approach because it corresponds to selecting a priori a set of small (pointwise) support regions $R_k$ with shape described by z=constant in each region.

The recovery of 3D structure from the 2D motion parameters is now discussed. The set of equations (22,23) defines an overconstrained system with respect to the 3D shape parameters $\{a_{mn}^k, 1 \leq k \leq K, 0 \leq m,n \leq N\}$ and to the 3D positions $\{t_{uf},t_{vf},\theta_f,\phi_f,\psi_f, 1 \leq f, \leq F\}$. The estimate $\{\hat{a}_{mn}^k\}$ of the object shape and the estimate $\{\hat{t}_{uf},\hat{t}_{vf},\hat{\theta}_f,\hat{\phi}_f,\hat{\psi}_f\}$ of the object positions are the LS solution of the system. One approach to this nonlinear LS problem is the following. First, solve for the translation parameters which leads to a closed-form solution. Then, replace the estimates $\{\hat{t}_{uf},\hat{t}_{vf}\}$ and solve for the remaining motion parameters $\{\theta_f,\phi_f,\psi_f\}$ and shape parameters $\{a_{mn}^k\}$ by applying a factorization approach.

The translation components along the image sensor plane at instant f, $t_{uf}$ and $t_{vf}$ affect only the set of parameters $\{a_{f00}^{uk}, 1 \leq k \leq K\}$ and $\{a_{f00}^{vk}, 1 \leq k \leq K\}$, respectively. If the parameters $\{a_{00}^k\}$ and $\{\theta_f,\phi_f,\psi\}$ are known, to estimate $\{t_{uf},t_{vf}\}$ is a linear LS problem. Without loss of generality, the object coordinate system may be chosen in such a way that $\Sigma_{k=1}^{K} a_{00}^k = 0$ (the first frame only restricts the rotation and the component of the translation along the image sensor plane, so that there is freedom to move the coordinate system along the axis orthogonal to the image sensor plane). With this choice, the estimates $\hat{t}_{uf}$ and $\hat{t}_{vf}$ are:

$$\hat{t}_{uf} = \frac{1}{K}\sum_{k=1}^{K} \hat{a}_{f00}^{uk} \quad \text{and} \quad \hat{t}_{vf} = \frac{1}{K}\sum_{k=1}^{K} \hat{a}_{f00}^{vk} \qquad (26)$$

To generate the matrix of 2D motion parameters, the set of translation estimates $\{\hat{t}_{uf}, \hat{t}_{vf}\}$ in the equation set (22,23) may be replaced. A set of parameters $\{\beta_f^{uk}, \beta_f^{vk}\}$ may be defined related to $\{a_{f00}^{uk}, a_{f00}^{vk}\}$ by:

$$\beta_f^{uk} = a_{f00}^{uk} - \frac{1}{K}\sum_{l=1}^{K} a_{f00}^{ul} \quad \text{and} \quad \beta_f^{vk} = a_{f00}^{vk} - \frac{1}{K}\sum_{l=1}^{K} a_{f00}^{vl} \qquad (27)$$

and $\beta_f^{uk}$ and $\beta_f^{vk}$ may be expressed in terms of the shape and motion parameters, according to (22,23), as:

$$\beta_f^{uk} = i_{zf} a_{00}^k \quad \text{and} \quad \beta_f^{vk} = j_{zf} a_{00}^k \qquad (28)$$

Next, the parameters $\{\beta_f^{uk}, a_{fmn}^{uk}, \beta_f^{vk}, a_{fmn}^{vk}, m, n=1, \ldots, N, f=2, \ldots, F, k=1, \ldots, K\}$ may be collected in a matrix R, which is called the matrix of 2D motion parameters:

$$R = \begin{bmatrix} \beta_2^{u1} & a_{210}^{u1} & \cdots & a_{2NN}^{u1} & \beta_2^{u2} & a_{210}^{u2} & \cdots & a_{2NN}^{u2} & \cdots & \beta_2^{uk} & a_{210}^{uk} & \cdots & a_{2NN}^{uK} \\ \cdots & \cdots & \cdots & \cdots & \cdots & \cdots & \cdots & \cdots & \cdots & \cdots & \cdots & \cdots & \cdots \\ \beta_F^{u1} & a_{F10}^{u1} & \cdots & a_{FNN}^{u1} & \beta_F^{u2} & a_{F10}^{u2} & \cdots & a_{FNN}^{u2} & \cdots & \beta_F^{uk} & a_{F10}^{uk} & \cdots & a_{FNN}^{uK} \\ \beta_2^{v1} & a_{210}^{v1} & \cdots & a_{2NN}^{v1} & \beta_2^{v2} & a_{210}^{v2} & \cdots & a_{2NN}^{v2} & \cdots & \beta_2^{vk} & a_{210}^{vk} & \cdots & a_{2NN}^{vK} \\ \cdots & \cdots & \cdots & \cdots & \cdots & \cdots & \cdots & \cdots & \cdots & \cdots & \cdots & \cdots & \cdots \\ \beta_F^{u1} & a_{F10}^{v1} & \cdots & a_{FNN}^{v1} & \beta_F^{v2} & a_{F10}^{v2} & \cdots & a_{FNN}^{v2} & \cdots & \beta_F^{vk} & a_{F10}^{vk} & \cdots & a_{FNN}^{vK} \end{bmatrix} \quad (29)$$

Collecting the motion and shape parameters in the $(F-1) \times 3$ matrix M and in the $3 \times K(N+1)^2$ matrix S as follows:

$$M = \begin{bmatrix} i_{x2} i_{x3} & \cdots & i_{xF} j_{x2} j_{x3} & \cdots & j_{xF} \\ i_{y2} i_{y3} & \cdots & i_{yF} j_{v2} j_{v3} & \cdots & j_{yF} \\ i_{z2} i_{z3} & \cdots & i_{zF} j_{z2} j_{z3} & \cdots & j_{zF} \end{bmatrix} \qquad (30)$$

$$S^T = \begin{bmatrix} 0 & 1 & 0 & 0 & \cdots & 0 & \cdots & 0 & 1 & 0 & 0 & \cdots & 0 \\ 0 & 0 & 1 & 0 & \cdots & 0 & \cdots & 0 & 0 & 1 & 0 & \cdots & 0 \\ a_{00}^1 & a_{10}^1 & a_{01}^1 & a_{11}^1 & \cdots & a_{NN}^1 & \cdots & a_{00}^K & a_{10}^K & a_{01}^K & a_{11}^K & \cdots & a_{NN}^K \end{bmatrix} \qquad (31)$$

according to the system of equations (22,23) and the expression (28), the following may be obtained:

$$R = MS^T \qquad (32)$$

The matrix of 2D motion parameters R is $2(F-1) \times K(N+1)^2$ but it is rank deficient. In a noiseless situation, R is rank 3 reflecting the high redundancy in the data, due to the 3D rigidity the object. This is a restatement of the rank deficiency that has been reported in the prior art for a matrix that collects image feature positions.

Estimating the shape and position parameters given the observation matrix R is a nonlinear LS problem. This problem has a specific structure: it is a bilinear constrained LS problem. The bilinear relation comes from (32) and the constraints are imposed by the orthonormality of the rows of the matrix M (30). The factorization approach may employ two stages. The first stage, the decomposition stage, solves the unconstrained bilinear problem $R = MS^T$ in the LS sense by computing the Singular Value Decomposition (SVD) of the matrix R and selecting the 3 largest singular values. From $R \approx UEV^T$, the solution is $$M = UE^{\frac{1}{2}}A$$

and $$S^T = A^{-1} E^{\frac{1}{2}} V^T,$$

where A is a non-singular 3×3 matrix. The second stage, the normalization stage, computes A by approximating the constraints imposed by the structure of the matrix M, where the matrix S has the specific structure of (31). The approximate solution may be refined using a two-step iterative method. The steps are: i) solve for shape with known positions, and ii) solve for positions with known shape. Step i) leads to a linear LS problem and step ii), although nonlinear, decouples the estimation of the positions at different instants.

Because the first two rows of $S^T$ are known, the unconstrained bilinear problem $R = MS^T$ may be solved by a rank 1 factorization of the matrix of 2D motion parameters, rather than a rank 3 factorization. For example, define $M = [M_0, m_3]$ and $S = [S_0, a]$. $M_0$ and $S_0$ contain the first two columns of M and S, respectively, $m_3$ is the third column of M, and a is the third column of S. The shape parameter vector a may be decomposed into the component that belongs to the space spanned by the columns of $S_0$ and the component orthogonal to this space as:

$$a = S_0 b + a_1, \quad \text{with } a_1^T S_0 = [0 \ 0]. \qquad (33)$$

With these definitions, R may be rewritten by inserting (33) in (32), as:

$$R = M_0 S_0^T + m_3 b^T S_0^T + m_3 a_1^T \qquad (34)$$

The decomposition stage may be formulated as:

$$\min_{M_0, m_3, b, a_1} \|R - M_0 S_0^T - m_3 b^T S_0^T - m_3 a_1^T\|_F \qquad (35)$$

where $\|.\|_F$ denotes the Frobenius norm. Because $S_0$ is known, the dependence of the expression above on $M_0$ is eliminated by solving the linear LS for $M_0$ in terms of the other variables, thus obtaining:

$$\hat{M}_0 = RS_0(S_0^T S_0)^{-1} - m_3 b^T \qquad (36)$$

where the Moore-Penrose pseudoinverse and the orthogonality between $a_1$ and $S_0$ are used. By replacing $\hat{M}_0$ in (35), the following is obtained:

$$\min_{m_3 a_1} \|\tilde{R} - m_3 a_1^T\|_F, \text{ where } \tilde{R} = R[I - S_0(S_0^T S_0)^{-1} S_0^T] \quad (37)$$

Thus, the decomposition stage does not determine the vector b. This is because the component of a that lives in the space spanned by the columns of $S_0$ does not affect the space spanned by the columns of the entire matrix S and the decomposition stage restricts only this last space.

The solution for $m_3$ and $a_1$ is given by the rank 1 matrix that best approximates $\tilde{R}$. In a noiseless situation, $\tilde{R}$ is rank 1 ($\tilde{R} = m_3 a_1^T$ by replacing (34) in (37)). By computing the largest singular value of $\tilde{R}$ and the associated singular vectors, the following is obtained:

$$\tilde{R} \simeq u\sigma v^T, \tilde{m}_3 = au, \tilde{a}_1^T = \frac{\sigma}{a} v^T \quad (38)$$

where a is a normalizing scalar different from 0. To compute u, σ and v, an SVD may be used, but the rank deficiency of $\tilde{R}$ enables the use of less expensive algorithms to compute u, σ and v. This makes the decomposition stage simpler than prior art techniques which used a rank 3 factorization. In fact, $\tilde{R}$ in (37) is R multiplied by the orthogonal projector onto the orthogonal complement of the space spanned by the columns of $S_0$. This projection reduces the rank of the problem from 3 (matrix R) to 1 (matrix $\tilde{R}$).

In the normalization stage, a and b may be computed by imposing the constraints that come from the structure of M. By replacing $\hat{m}_3$ in (36), the following is obtained:

$$\bar{M} = [\bar{M}_0 \ \hat{m}_3] = N \begin{bmatrix} I_{2 \times 2} & 0_{2 \times 1} \\ -ab^T & a \end{bmatrix}, \text{ where } N = [RS_0(S_0^T S_0)^{-1} \ u] \quad (39)$$

The constraints imposed by the structure of M are the unit norm of each row and the orthogonality between row j and row j+F−1. In terms of N, a, and b, the constraints are:

$$n_i^T \begin{bmatrix} I_{2 \times 2} & -ab \\ -ab^T & a^2(1+b^T b) \end{bmatrix} n_i = \quad (40)$$

$$1 \text{ and } n_j^T \begin{bmatrix} I_{2 \times 2} & -ab \\ -ab^T & a^2(1+b^T b) \end{bmatrix} n_{j+F-1} = 0$$

where $n_i^T$ denotes the row i of matrix N. The vectors a and b from the linear LS solution of the system above. Thus, the normalization stage is also simpler than in the prior art because the number of unknowns is 3 (a and b=$[b_1, b_2]^T$) as opposed to the 9 entries of a generic 3×3 normalization matrix.

To obtain the solution to the original bilinear constrained problem given by (32), the approximate solution just presented may be refined. This refinement may be accomplished by the 3D shape refinement module 24, as discussed further hereinbelow. Given the matrix M, to estimate the shape parameter vector a is a linear LS problem. Thus, the following may be obtained:

$$\hat{a}^T = (m_3^T m_3)^{-1} m_3^T (R - M_0 S_0^T) = \frac{m_3^T (R - M_0 S_0^T)}{m_3^T m_3} \quad (41)$$

From (29–32), note that the object position at instant f only affects the rows f and f+F of the matrix R. These rows may be denoted by $r_f^T$ and $r_{f+F}^T$. The LS estimate of the object position at each frame f=2,3, . . . , F, given the matrix S, is:

$$c_f(\theta, \phi, \psi) = \begin{bmatrix} r_f - S[\cos\theta\cos\phi\sin\phi - \sin\theta\cos\psi]^T \\ r_{f+F} - S[\sin\theta\sin\psi - \cos\theta\sin\phi\cos\psi \ \cos\phi\cos\psi \ \sin\theta\sin\phi\cos\psi + \cos\theta\sin\psi]^T \end{bmatrix} \quad (42)$$

$$\{\hat{\theta}_f \hat{\phi}_f, \hat{\psi}_f\} = \arg \min_{\{\theta, \phi, \psi\}} c_f^T(\theta, \phi, \psi) c_f(\theta, \phi, \psi) \quad (43)$$

To solve the non-linear minimization (43) according to one embodiment, a Gauss-Newton method may be utilized. When computing $\hat{\theta}_f, \hat{\phi}_f, \hat{\psi}_f$, the iterative process may be started with the initial guess $\theta_0 = \hat{\theta}_{f-1}, \phi_0 = \hat{\phi}_{f-1}, \psi_0 = \hat{\psi}_{f-1}$. For f=1, $\theta_1 = \phi_1 = \psi_1 = 0$ by definition.

Thus, after recovering the 3D motion $m_f$ as described hereinbefore, the 3D motion estimates may be inserted into the cost function (8) and minimized with respect to the unknown shape S. First, the relation between the image trajectories $u_f(s)$ and the 3D shape S and the 3D motion $m_f$ may be made explicit. The coordinate s of the generic point in the object surface is chosen to coincide with the coordinates $[x,y]^T$ of the object coordinate system. Under orthography, a point with coordinate s in the object surface is projected on coordinate $U=[x,y]^T=s$ (recall that the object coordinate system was chosen to coincide with the image sensor coordinate system). At instant f, that point is projected to:

$$u_f(s) = u_f\left(\begin{bmatrix} x \\ y \end{bmatrix}\right) = \begin{bmatrix} i_{xf} & i_{yf} & i_{zf} \\ j_{xf} & j_{yf} & j_{zf} \end{bmatrix} \begin{bmatrix} x \\ y \\ z \end{bmatrix} + \begin{bmatrix} t_{xf} \\ t_{yf} \end{bmatrix} = [N_f \ n_f] \begin{bmatrix} s \\ z \end{bmatrix} + t_f \quad (44)$$

$$= N_f s + n_f z + t_f,$$

where $i_{xf}, i_{yf}, i_{zf}, j_{xf}, j_{yf}$, and $j_{zf}$ are entries of the 3D rotation matrix. The 3D shape is represented by the unknown relative depth z.

The 3D shape and the 3D motion are observed in a coupled way through the 2D motion on the image plane (see expression (44)). When the 3D motion is known, the problem of inferring the 3D shape from the image sequence is simplified. In fact, the local brightness change constraint leads to a single restriction, which is insufficient to determine the two components of the local image motion (this is the so-called aperture problem). The method described herein of estimating directly the 3D shape overcomes the aperture problem because only the local depth as a single unknown remains after computing the 3D motion. To better illustrate why the problem becomes much simpler when the 3D motion is known, consider a modified image sequence {$\bar{I}_f, 1 \leq f \leq F$}, obtained from the original sequence and the 3D motion. The 2D motion of the brightness pattern on image sequence $\bar{I}_f$ depends on the 3D shape in a very particular way.

Consider the image $\tilde{I}$ related to $I_f$ by the following affine mapping that depends only on the 3D position at instant f:

$$\tilde{I}_f = I_f(N_f s + t_f). \tag{45}$$

From this definition it follows that a point s, that projects to $u_f(s)$ in image $I_f$, is mapped to $\tilde{u}_f(s) = N_f^{-1}[u_f(s) - t_f]$ in image $\tilde{I}_f$. Replacing $u_f(s)$ by expression (44), the following is obtained for the image motion of the modified sequence $\{\tilde{I}_f\}$:

$$\tilde{u}_f(s) = s + N_f^{-1} n_f z. \tag{46}$$

Expression (46) shows that the trajectory of a point s in image sequence $\{\tilde{I}_f\}$ depends on the relative depth of that point in a very particular way. In fact, the trajectory has the same shape at every point. The shape of the trajectories is given by the evolution of $N_f^{-1} n_f$ across the frame index f. Thus, the shape of the trajectories depends uniquely on the rotational component of the 3D motion. The relative depth z affects only the magnitude of the trajectory. A point with relative depth=0 is stationary in $\{\tilde{I}_f\}$, since $u_f(s) = s$ from (46) for arbitrary 3D motion of the object.

By minimizing the cost function (8) with respect to the relative depth of each point s, an estimate of the magnitude of the trajectory of the point to where the points s maps in image sequence $\{\tilde{I}_f\}$ is, in essence, obtained. The shape of the trajectory is known, because it depends only on the 3D motion. According to one embodiment, the minimization approach of the present invention may be based on this characteristic of the ML cost function. A continuation-type method may be used to estimate the relative depth as more frames are being taken into account. When only a few frames are taken into account, the magnitude of the trajectories on image sequence $\{\tilde{I}_f\}$ can only be roughly estimated because the length of the trajectories is short and their shape may be quite simple. When enough frames are considered, the trajectories on image sequence $\{\tilde{I}_f\}$ are long enough, their magnitude is unambiguous, and the relative depth estimates are accurate. The number of frames that need to be considered depends on the 3D shape of the object and on its 3D motion. That is, the object motion must be sufficient for perception of the 3D shape of the object itself, without other cues (such as shading, color, etc.) except the motion itself.

The advantage of the continuation-type method is that it provides a computationally simple way to estimate the relative depth because each stage of the algorithm updates the estimate using a Gaussian-Newton method, i.e., by solving a liner problem. Consider the relative depth z to be constant in a region R. Then, z may be estimated by minimizing the cost resultant from neglecting the weighting factor $$\frac{J_f(s) J_g(s)}{\sum_{h=1}^{F} J_h(s)}$$

in the ML cost function (8). Thus, the following is obtained:

$$\tilde{z} = \arg\min_{z} E(z), \; E(z) = \sum_{f=2}^{F} \sum_{g=1}^{f-1} \int_R e^2(z) \, ds \tag{47}$$

where:

$$e(z) = I_f(N_f s + n_f z + t_f) - I_g(N_g s + n_g z + t_g). \tag{48}$$

Hence, $\tilde{z}$ may be computed by refining a previous estimate $z_0$, as:

$$\tilde{z} = z_0 + \hat{\delta}_z, \quad \hat{\delta}_z = \underset{\delta_z}{\arg\min} \, E(z_0 + \delta_z). \tag{49}$$

The Gauss-Newton method neglects the second and higher order terms of the Taylor series expansion of $e(z_0 + \delta_z)$. By making this approximation, the following may be obtained:

$$\hat{\delta}_z = -\frac{\sum_{f=2}^{F} \sum_{g=1}^{f-1} \int_R e(z_0) e'(z_0)}{\sum_{f=2}^{F} \sum_{g=1}^{f-1} \int_R [e'(z_0)]^2}, \tag{50}$$

where e' is the derivative of e with respect to z. By differentiating (48), the following is obtained:

$$e'(z) = I_{fx}(N_f s + n_f z + t_f) i_{zf} + I_{fy}(N_f s + n_f z + t_f) j_{zf} - I_{gx}(N_g s + n_g s + t_g) i_{zg} - I_{gy}(N_g s + n_g s + t_g) j_{zg}, \tag{51}$$

where $I_{fx}$ and $I_{fy}$ denote the components of the spatial gradient of image $I_f$.

According to one embodiment, at the beginning, it may be assumed that $z_0 = 0$ for any range R. Square regions may be used where z is estimated as being constant. The size of the regions determines the resolution of the relative depth estimate. Large regions may be used when processing the first frames, and the size of regions may be decreased as the continuation method takes into account more frames.

Figure 4:
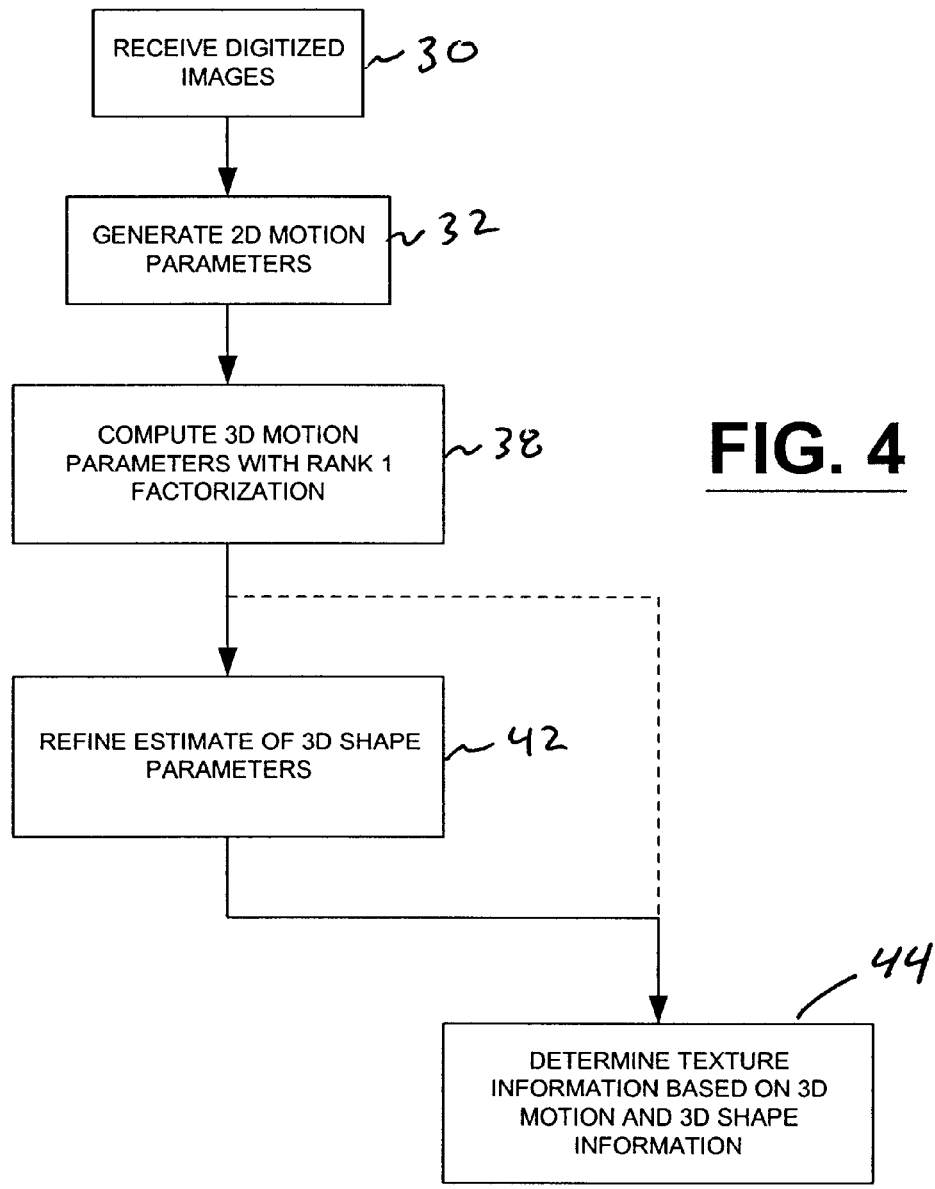
FIG. 4, is a block diagram of the process flow through the processor of the system of FIG. 1 according to one embodiment of the present invention.

FIG. 4 is a block diagram illustrating the process flow through the processor 16 of the system 10 according to one embodiment of the present invention. The process starts at block 30, where the digitized sequence of images of the scene is received from the frame grabber 14. Next, at block 32, the 2D motion filter module 18 of the processor 16, as discussed hereinbefore, generates the two-dimensional motion parameters for an object in the scene as well as for the background.

From block 32, the process advances to block 38, where the 3D structure recovery module 20 computes the 3D motion parameters. As discussed hereinbefore, according to one embodiment, this involves an LS fitting initialized by a rank 1 factorization of a matrix. From block 38, the process advances to block 42, where the 3D shape refinement module 24 refines the 3D shape motion parameters. As discussed hereinbefore, the 3D shape refinement module 24 may refine the 3D shape based on the 3D motion information computed by the 3D structure recovery module 20 using a continuation-type multiresolution approach that approximates the solution iteratively using a Gaussian-Newton method.

From block 42, the process advances to block 44, where the texture recovery module 22 determines the texture parameters for the object from the image sequence based on the computed 3D shape and 3D motion parameters. As discussed hereinbefore, the texture recovery module 22 may determine the texture parameters using, in part, the refined 3D shape parameters as may determined by the 3D shape refinement module 24. According to another embodiment, the texture recovery module 22 may determine the texture parameters based on the 3D shape parameters as computed by the 3D structure recovery module 20.

Figure 5C:
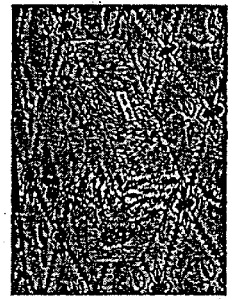
FIGS. 5a–c each represent an image of a sequence of images of a box on a carpet.
Figure 5B:
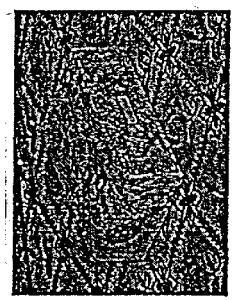
Figure 5A:
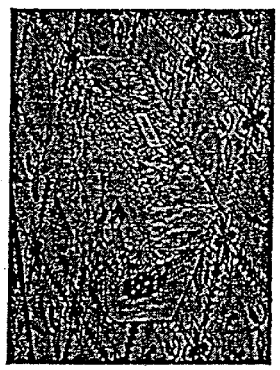
Figure 6D:
FIGS. 6a–d represent the frontal view of the four elemental constructs of the piecewise planar mosaics representation of the box video sequence of FIGS. 5a–c.
Figure 6C:
Figure 6B:
Figure 6A:
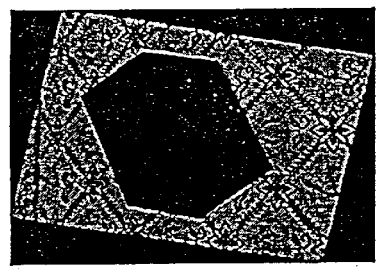
Figure 7:
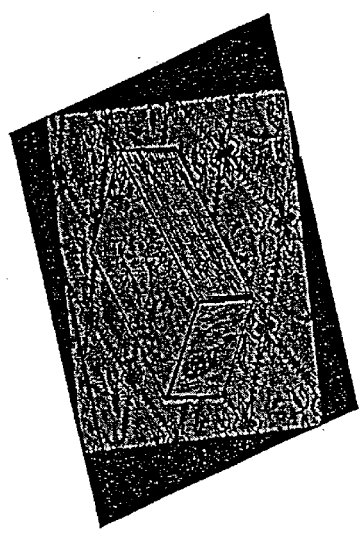
FIG. 7 is a perspective view of the reconstructed 3D shape and texture of the box of the video sequence of FIGS. 5a–c generated according to an embodiment of the present invention.

FIGS. 5–7 illustrate experimental results obtained with the system 10 of the present invention. FIGS. 5a–c are three images in a sequence of fifty images of a box over a carpet. The image sensor 12 motion was approximately a rotation around the box. FIGS. 5a–c are images 1, 15, and 30, respectively, of the 50 image sequence. In the three images of FIGS. 5a–c, four distinct 2D motion parameters were detected in the sequence: one corresponds to the floor, and the other three correspond to the visible faces of the box. Applying the rank 1 factorization described hereinbefore, the 3D structure parameters were recovered from the computed 2D motion parameters. The texture of the model was recovered by averaging the images after the appropriate warping. The spatial limits of the planar patches were determined as follows: each edge that links two visible patches was computed from the intersection of the planes corresponding to the patches; each edge that is not in the intersection of two visible patches was computed by fitting a line to the boundary that separates two regions with different 2D motion parameters.

FIGS. 6a–d show frontal views of the four elemental constructs of the piecewise planar mosaics representation of the box video sequence. FIG. 6a shows that the planar patch corresponding to the carpet is not complete because the region of the box occluded by the box was not recovered from the video sequence. FIGS. 6c–d are images of the three visible faces of the box.

FIG. 7 shows a perspective view of the reconstructed 3D shape and texture generated according to the techniques of the present invention. FIG. 7 demonstrates that the angles between the planar patches are correctly recovered. The artifacts that are seen on the edges linking the planar patches are due to small alignment errors. Note that, rather than rendering a 3D surface model, the planar patches of FIG. 6a–d were warped to generate the image of FIG. 7. According to another embodiment of the present invention, the artifacts may be removed by interpolating the texture between the faces.

Benefits of the present invention may be realized, for example, in video coding applications. Model-based video representations enable very low bit rate compression. Within the framework of the present invention, instead of representing a video sequence in terms of frames and pixels, the recovered 3D structure may be used. A video sequence may be represented by the 3D shape and texture of the object, and its 3D motion. Because the 3D motion and 3D shape are coded with a few parameters, the number of bytes necessary to code the entire sequence is governed by the size of the object texture representation. The texture is coded as a set of ordinary images, one for each planar patch (see, for example, FIGS. 5–7). By using this model-based representation, the storage space may be dramatically reduced because the brightness values are only coded once, as opposed to the redundancy of coding the brightness values at each of the frames of the original sequence. This may be useful in transmission over wireline and wireless communication links, as described further hereinbelow with respect to FIG. 17.

The present invention may also be beneficial in video content addressing applications. Content-based addressing is an important application of the 3D model-based video representation. Current systems that provide content-based access work by first segmenting the video in a sequence of shots and then labeling each shot with a distinctive indexing feature. The most common features used are image-based features, such as color histograms or image moments. By using 3D models as with the present invention, both the temporal segmentation and the indexing may be improved. The temporal segmentation can account for the 3D content of the scene. Indexing by 3D features, directly related to the 3D shape, enable queries by object similarity.

Figure 8B:
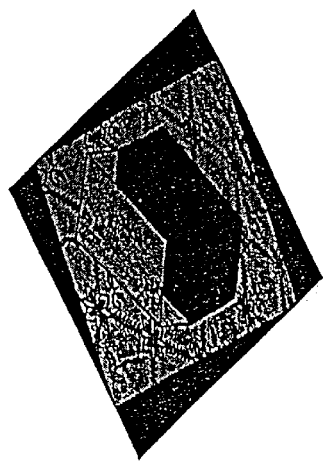
FIGS. 8a–b are each a rotated perspective view of the 3D model represented in FIG. 7.
Figure 8A:
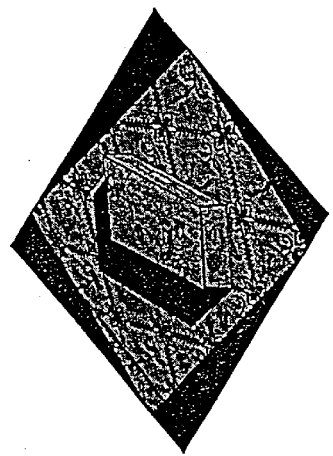

In addition, benefits of the present invention may also be realized in virtual reality applications. The 3D models obtained from the video data according to the present invention may be used to build a synthetic image sequence. This synthesis is achieved by specifying the sequence of viewing positions along time. The viewing positions are specified by the user, either in an interactive way or from an automatic procedure. For example, the images in FIGS. 8a–b were obtained by rotating the 3D model represented in FIG. 7. Note that only the portion of the model that was seen in the original video sequence is synthesized in the views of FIGS. 8a–b. Other views may be generated in a similar way. Synthetic images may be obtained by selecting from these views a rectangular window, corresponding to the camera field of view. This is an example of virtual manipulation of real objects. More complex scenes may be obtained by merging real objects with virtual entities.

According to another embodiment of the present invention, the 3D structure recovery module 20 may accommodate confidence weights for the feature trajectories. This may be achieved, for example, without additional computational cost by rewriting the problem as the factorization of a modified matrix. Consider a set of N feature points tracked along an image sequence of F frames. Under orthography, as discussed hereinbefore, the projection of feature n in frame f, denoted by $(u_{fn}, v_{fn})$, is:

$$u_{fn} = i_{xf} x_n + i_{yf} y_n + i_{zf} z_n + t_{uf} \tag{52}$$

$$v_{fn} = j_{xf} x_n + j_{yf} y_n + j_{zf} z_n + t_{vf} \tag{53}$$

where $i_{xf}, i_{yf}, i_{zf}, j_{xf}, j_{yf},$ and $j_{zf}$ are entries of the well known 3D rotation matrix, and $t_{uf}$ and $t_{vf}$ are the components of the object translation along the image sensor plane. Each component of the trajectory of the feature n is observed with additive Gaussian white noise of variance $\sigma_n^2$. By choosing the origin of the object coordinate system in such a way that $$\sum_n \frac{x_n}{\sigma_n^2} = \sum_n \frac{y_n}{\sigma_n^2} = \sum_n \frac{z_n}{\sigma_n^2} = 0,$$

the following estimates may be obtained:

$$\hat{t}_{uf} = \frac{\sum_{n=1}^{N} \frac{u_{fn}}{\sigma_n^2}}{\sum_{n=1}^{N} \frac{1}{\sigma_n^2}} \text{ and } \hat{t}_{vf} = \frac{\sum_{n=1}^{N} \frac{v_{fn}}{\sigma_n^2}}{\sum_{n=1}^{N} \frac{1}{\sigma_n^2}} \tag{54}$$

for the translation along the image sensor plane. Expressions (54) generalize (26). Replacing the translation estimates in equation system (52,53) and defining $$\overline{u}_{fn} = u_{fn} - \frac{\sum_{n=1}^{N} \frac{u_{fn}}{\sigma_n^2}}{\sum_{n=1}^{N} \frac{1}{\sigma_n^2}}, \overline{v}_{fn} = v_{fn} - \frac{\sum_{n=1}^{N} \frac{v_{fn}}{\sigma_n^2}}{\sum_{n=1}^{N} \frac{1}{\sigma_n^2}} \tag{55}$$

and the matrices R, M, and S as hereinbefore, as before, the following is obtained: $R = MS^T$.

To take into account the different variances $\{\sigma_n^2\}$, the $2(F-1) \times N$ matrix $\Sigma$ may be defined as:

$$\Sigma = \begin{bmatrix} \sigma_1^{-1} & \sigma_2^{-1} & \ldots & \sigma_N^{-1} \\ \sigma_1^{-1} & \sigma_2^{-1} & \ldots & \sigma_N^{-1} \\ \ldots & \ldots & \ldots & \ldots \\ \sigma_1^{-1} & \sigma_2^{-1} & \ldots & \sigma_N^{-1} \end{bmatrix} \quad (56)$$

where each entry of $\Sigma$ represent the weight to be given to each entry of matrix R. The weighted factorization may be formulated by writing the Maximum Likelihood estimate. This estimate generalizes $$\min_{M,S} \|R - MS^T\|_F \quad \text{as:}$$

$$\min_{M,S} \|(R - MS^T) \otimes \Sigma\|_F \quad (57)$$

where $\otimes$ denotes the Hadamard product. Due to the structure of $\Sigma$, expression (57) may be rewritten as the factorization of a modified matrix $R_w$:

$$\min_{M,S} \|R_w - MS_w^T\|_F \quad (58)$$

where: $R_w = RW$, $S_w = WS$, \quad (59)

$$W = diag\left(\frac{1}{\sigma_1}, \ldots, \frac{1}{\sigma_N}\right) = [w_{ij}], \; [w_{ij}] = \frac{1}{\sigma_i}\delta_{i-j}. \quad (60)$$

Note that $R_w$ and the first two rows of $S_w^T$ are known from (59). Expression (58) may be minimized by using the procedure described previously to compute the estimates $\hat{M}$ and $\hat{S}$. The estimate $\hat{S}$ may be obtained from $\hat{S}_w$ by $\hat{S} = W^{-1}\hat{S}_w$.

The weight matrix $\Sigma$ may be restricted to have the structure of (56). For a general matrix $\Sigma$, it is not possible to write the minimization (57) in the form of a factorization (58). In fact, the unconstrained bilinear weighted LS problem (57) has a single global minimum, up to a scale factor, when $\Sigma$ has the rows all equal or the columns all equal. It can be shown that this is not true for a generic matrix $\Sigma$. In this case, the existence of local minima makes nontrivial the using of iterative numerical techniques.

The following describes how the rank 1 approximation of a given matrix $\tilde{R}$ is computed. The problem is:

$$\min_{u,v} \|\tilde{R} - uv^T\|_F \quad (61)$$

which comes from expression $$\tilde{R} \cong u\sigma v^T, \; \hat{m}_3 = \alpha u, \; \hat{a}^T = \frac{\sigma}{\alpha} v^T,$$

where $\alpha$ is a normalizing scalar different from 0 and by including the scaling factor $\sigma$ into the vector v. The solution to (61) is known to be given by the SVD of $\tilde{R}$ after selecting the largest singular value.

The rank deficiency of $\tilde{R}$ enables the use of a less expansive iterative technique to compute the decomposition. It is based on the fact that only the singular vector v that corresponds to the largest singular value has to be computed. Since the vector v is the eigenvector of $\tilde{R}^T \tilde{R}$ that corresponds to the largest eigenvalue, we start with a random choice $v_0$ and iterate:

$$v_{i+1} = \frac{v_i^T v_i}{v_i^T \tilde{R}^T \tilde{R} v_i} \tilde{R}^T \tilde{R} v_i \quad (62)$$

until convergence. In each iteration, the component of $v_i$ along the vector v is more magnified than the components along the other eigenvectors of $\tilde{R}^T \tilde{R}$. The fraction in (62) is a normalizing factor. The vector u is then computed by solving (61) with v given by the final value of the iterative process above:

$$u = \frac{\tilde{R}v}{v^T v} \quad (63)$$

According to one embodiment, this iterative procedure can be generalized to compute the best rank r approximation of a given matrix, for r>1, using a recursive formulation to the original rank 3 factorization. This embodiment may store and update the N×N matrix $R^T R$. Then, this matrix may be used to compute, iteratively, the best rank 3 approximation of R. When the number of features is large, the matrix $R^T R$ becomes very large. According to another embodiment, in the decomposition stage, instead of computing $\tilde{R}^T \tilde{R}$, the computation of each iteration (62) may be split by first computing $\tilde{R}v_i$:

$$\overline{v}_{i+1} = \tilde{R}v_i, \; v_{i+1} = \frac{v_i^T v_i}{\overline{v}_i^T \overline{v}_i} \tilde{R}^T \overline{v}_i. \quad (64)$$

The benefits of the present invention are now described with reference to three experiments. The first experiment uses synthetic data to illustrate properties of the rank 1 matrix $\tilde{R}$. The second experiment compares the computational cost of our approach with the rank 3 factorization approach of the prior art. In the third experiment, the 3D shape and 3D motion are recovered from a real video sequence.

Figure 9:
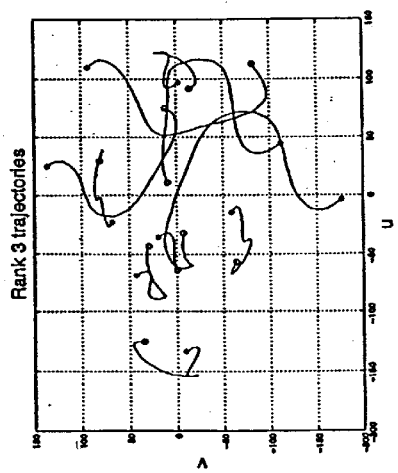
FIG. 9 is a plot of the feature trajectories on an image plane for a set of ten (10) feature points randomly located inside a cube obtained for a set of fifty (50) frames.

Experiment 1: This experiment illustrates the properties of the rank 1 matrix $\tilde{R}$ by using synthetic data. A set of 10 feature points were generated randomly located inside a cube. The 3D rotational motion was simulated by synthesizing a smooth time evolution for the Euler angles. The perspective projection model was used to project the features onto the image plane. The lens focal length parameter was set to a value high enough such that the orthographic projection can be considered a valid approximation. FIG. 9 shows the feature trajectories on the image plane obtained for a set of 50 frames, after adding noise. For each trajectory, the initial position is marked with 'o' and the final position is marked with '*'. The trajectories in FIG. 9 are a representation of the columns of matrix R. The trajectory for feature n shows the $n^{th}$ column of R, i.e., it is the evolution of the image point $(R_{f,n}, R_{F-1+f,n})$ across the frame index f(see expression (29)). The challenge in the structure from motion problem comes from the fact that the 3D shape and the 3D motion are observed in a coupled way through the 2D motion on the image plane (the trajectories in FIG. 9).

Figure 10:
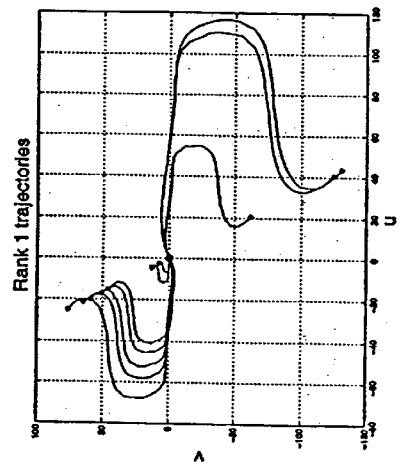
FIG. 10 is a plot of the trajectories of FIG. 9 for the matrix $\tilde{R}$.

From the data in matrix R, the matrix $\tilde{R}$ was computed given by expression $\tilde{R} = R[I - S_0(S_0^T S_0)^{-1} S_0^T]$. FIG. 10 plots the columns of $\tilde{R}$ in the same way as FIG. 9 plots R, i.e., it shows the evolution of $(\tilde{R}_{f,n}, \tilde{R}_{F-1+f,n})$ across the frame index f, for each feature n. It is noted that all trajectories in FIG. 10 have equal shape, unlike the ones in FIG. 9. This is because the dependence of the trajectories on the x and y coordinates of the features have been eliminated, by making the subspace projection $\tilde{R}=R[I-S_0(S_0^T S_0)^{-1}S_0^T]$. Each trajectory in FIG. 10 is a scaled version of a fixed trajectory that does not depend on the object shape. This fixed trajectory is determined uniquely by the 3D motion of the object; it corresponds to the third column of matrix M, $m_3$. The scaling factor for each trajectory in FIG. 10 is the relative depth z of the corresponding feature point. This way the influence on the trajectories of the 3D motion is decoupled from the influence of the 3D shape.

Figure 11:
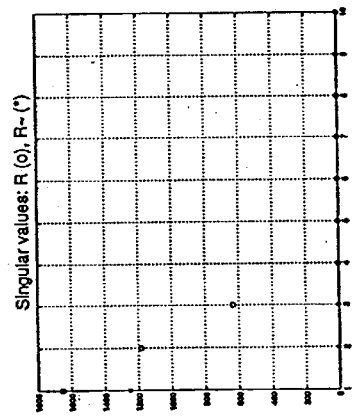
FIG. 11 is a plot of the ten (10) largest singular values for the trajectories of FIGS. 9 and 10.

FIG. 11 plots the 10 larger singular values of matrices R, marked with 'o', and $\tilde{R}$, marked with '*'. While the three larger singular values of R contain the most of the energy, $\tilde{R}$ is well described by only the largest singular value.

Experiment 2: To compare the computational cost of the algorithms of the present invention and the prior art, the experiment described hereinbefore with respect to Experiment 1 was run for a fixed number of F=50 frames and a number of N feature points varying from 10 to 100; and for a fixed number of N=50 feature points and a number of F frames varying from 10 to 100. The average number of MATLAB floating point operations (FLOPS) was computed over 1000 tests for each experiment.

For each experiment, the 3D shape and 3D motion were computed by using three methods: i) the rank 3 factorization method that computes the SVD, ii) the same method but computing the factorization of the rank 3 matrix R by using an iterative procedure similar to the one described hereinbefore, expression (64), and iii) formulation of the factorization as a rank 1 problem according to the present invention. The second method is included in the experiment because it is the fastest way to compute the rank 3 factorization, making fair the comparison with the third method. FIGS. 12a–b and 13a–b plot the average number of FLOPS as a function of the number of frames and the number of feature points, for each of the three methods. The number of FLOPS are marked with dotted lines for method i), dashdotted lines for method ii), and solid lines for method iii). FIGS. 12a and 13a show the three curves, while FIGS. 12b and 13b show only the curves for methods ii) and iii) using a different vertical scale, for better visualization.

In FIGS. 12a and 13a, it is noted that that the number of FLOPS is much larger for the prior factorization method (method i) than for the iterative approaches. This is due to the high computational cost of the SVD. In FIGS. 12b and 13b, it is noted that the number of FLOPS increases approximately linearly with both the number of frames and the number of feature points, for both iterative methods ii) and iii). The increasing rate is lower for the factorization of the rank 1 matrix $\tilde{R}$ than the rank 3 matrix R. This is because both the decomposition and normalization stages in method iii) are simpler than the ones in method ii). In all the experiments, the performance of the three methods in terms of the accuracy of the estimates of the 3D structure are indistinct. However, it must be pointed out that the rank 1 factorization results can suffer a slight degradation if the x and y coordinates of the feature points are very inaccurate in frame 1.

Experiment 3: The first frame of a video sequence of 30 frames is shown in FIG. 14a. It shows a building. Two planar walls meet along a smooth (round) edge. One hundred selected features are marked with white squares. FIG. 14b represents the "trackability" of the feature candidates. The brighter the point, the most reliable the tracking. The feature points were chosen by selecting the peaks of this image. Each feature was assigned the confidence weight given by the value of the corresponding peak.

The feature points were tracked by matching the intensity pattern of each feature along the sequence. Using the rank 1 weighted factorization described hereinbefore, the 3D motion and the relative depth of the feature points was recovered from the set of feature trajectories. FIG. 15 show two perspective views of the reconstructed 3D shape with the texture mapped on it. The angle between the walls is clearly seen and the round edge is also reconstructed.

Figure 16:
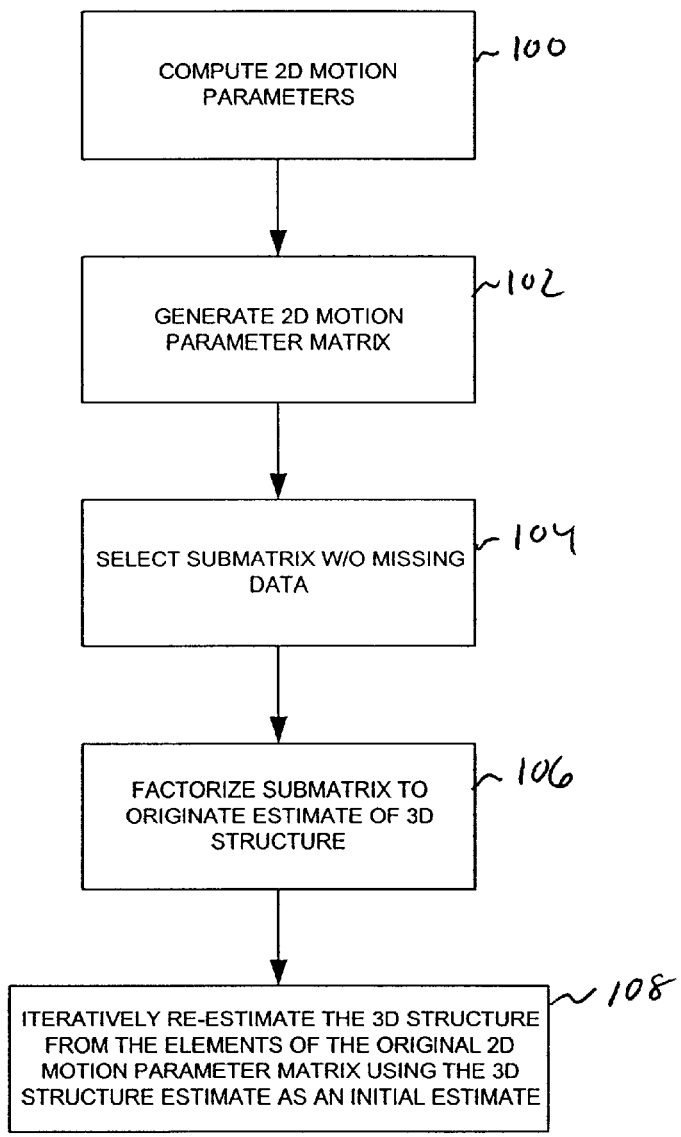
FIG. 16 is a block diagram of the process flow through the processor of the system of FIG. 1 according to one embodiment of the present invention.

As discussed hereinbefore, the present invention may be extended to accommodate the possibility of occlusions in the scene to be modeled. Where portions of the scene are occluded, during the image sequence new patches will appear and some patches will disappear. FIG. 16 is a diagram of a portion of the process flow through the processor 16 according to one such embodiment of the present invention for enabling the possibility of occlusions. The process flow begins at block 100, where the 2D motion filter module 18 computes the 2D motion parameters from the image sequence. At block 102, the 2D motion parameter matrix is generated as described hereinbefore, except that, due to the patches that are not seen in the image sequence because of the occlusions in the scene, the matrix will have missing entries.

To factorize the matrix, at block 104, the 3D structure recovery module 20 may select a submatrix of the 2D motion parameter matrix without missing data. The selected submatrix thus contains a set of elements of the original 2D motion parameter matrix that corresponds to a set of patches that were seen in a set of frames. Next, at block 106, the 3D structure recovery module 20 may factorize the submatrix. The factorization originates an estimate of the 3D structure (3D shape and 3D motion). The 3D structure estimate, however, is incomplete in that it contains only the information relative to the patches and frames selected in the submatrix at block 104.

Continuing to block 108, the 3D structure recovery module 20 may recover the 3D structure by iteratively re-estimating the 3D structure (3D shape and 3D motion) from the elements of the original 2D motion parameter matrix using the 3D structure estimate generated at block 106 as an initial estimate. According to one embodiment, the 3D structure recovery module 20 may recover the 3D structure by i) computing the 3D shape with known 3D motion and ii) computing the 3D motion with known 3D shape. Both steps lead to linear LS problems. To avoid falling into local minima using this method, new patches and new frames (relative to the ones corresponding to the submatrix selected at block 104) may be, for example, incorporated gradually or all at once. For an embodiment in which the new patches and frames are incorporated gradually, the two-step optimization may be performed each time a new frame is added and each time a new patch is added. According to another embodiment, sets of frames and patches may be incorporated at each time.

Figure 17:
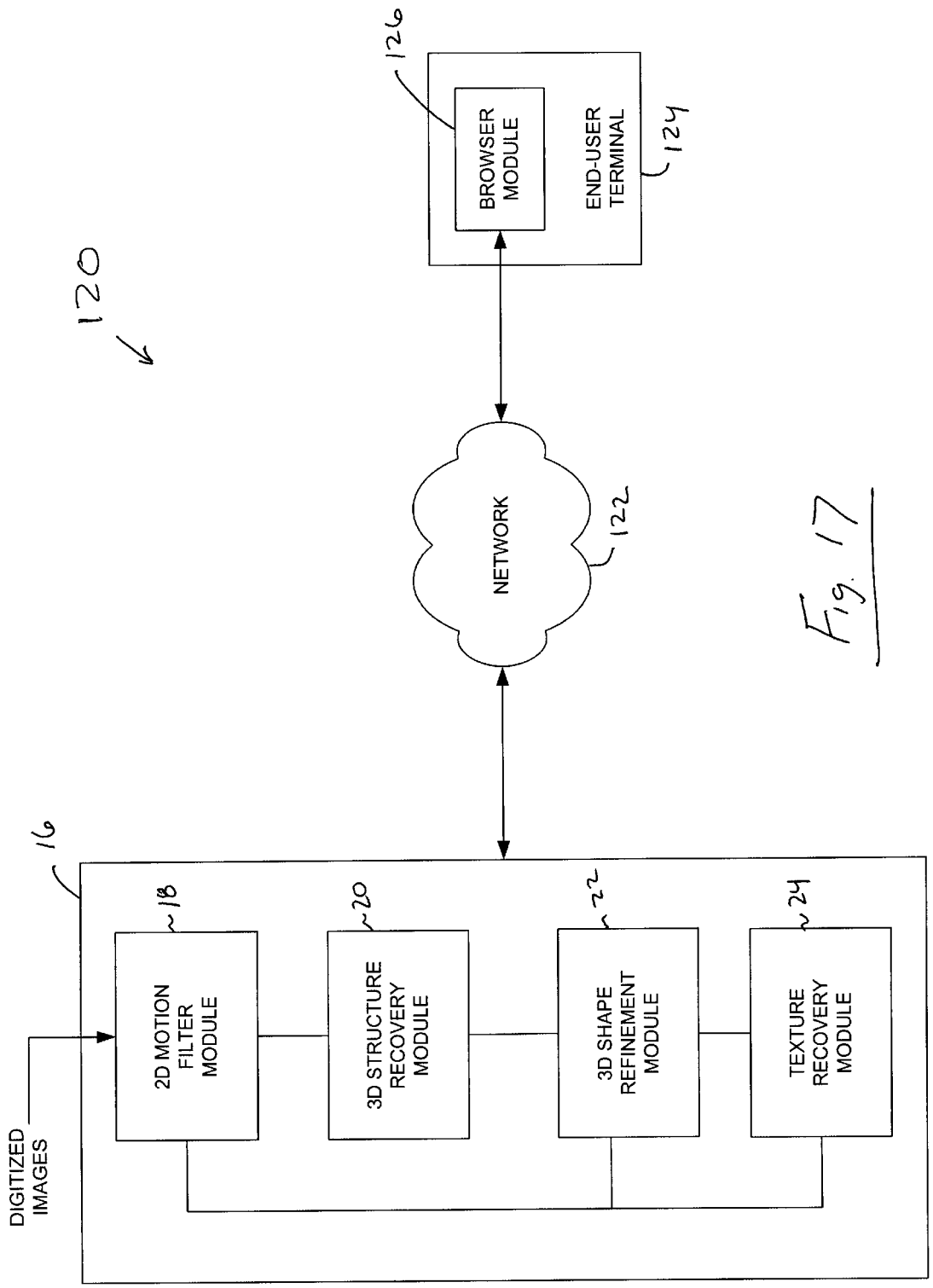
FIG. 17 is a diagram of a communications network according to one embodiment of the present invention.

FIG. 17 is a diagram of a communications network 120 according to one embodiment of the present invention. The communications network 120 includes the processor 16 in communication, via a network 122, an end-user terminal 124. The network 122 may be, for example, an internet protocol (IP)-based network such as, for example, the Internet or an intranet, including, for example, either wireline or wireless communications links. According to such an embodiment, the processor 16 may be adapted, for example, to transmit, via the network 122, to the end-user terminal 124 the set of 3D shape and 3D motion parameters. The end-user terminal 124 may be, for example, personal computer, a laptop, or a workstation, and may include a browser module 126 for interfacing with the parameters transmitted by the processor 16. According to another embodiment, portions of certain of the modules 18, 20, 22, and 24 may be included on both the processor 16 and the end-user terminal 124. According to such an embodiment, the processor 16 may generate the matrix R̂, which may then be transmitted, via the network 122, to the end-user terminal 124 for decoupling to generate the set of 3D shape and 3D motion parameters.

Although the present invention has been described herein with respect to certain embodiments, those of ordinary skill in the art will recognize that many modifications and variations of the present invention may be implemented. The foregoing description and the following claims are intended to cover all such modifications and variations.

What is claimed is:

1. A system for generating a three-dimensional model of an object from a two-dimensional image sequence, comprising:
   an image sensor for capturing a sequence of two-dimensional images of a scene, the scene including the object;
   a two-dimensional motion filter module in communication with the image sensor for determining from the sequence of images a plurality of two-dimensional motion parameters for the object; and
   a three-dimensional structure recovery module in communication with the two-dimensional motion filter module for estimating a set of three-dimensional shape parameters and a set of three-dimensional motion parameters from the set of two-dimensional motion parameters using a rank 1 factorization of a matrix.

2. The system of claim 1, wherein the image sensor includes a digital camera.

3. The system of claim 1, wherein the image sensor includes an analog camera, and further comprising a frame grabber connected between the image sensor and the two-dimensional motion filter module for digitizing images captured by the image sensor.

4. The system of claim 1, wherein:
   the two-dimensional motion filter module is for determining a plurality of two-dimensional motion parameters for each of a plurality of surface patches of the object; and
   the three-dimensional structure recovery module is for estimating the set of three-dimensional shape parameters from the set of two-dimensional motion parameters for each of the plurality of surface patches of the object.

5. The system of claim 1, wherein:
   the two-dimensional motion filter module is further for assigning confidence weights to certain of the two-dimensional motion parameters; and
   the three-dimensional structure recovery module is for estimating the set of three-dimensional shape parameters and the set of three-dimensional motion parameters from the set of two-dimensional motion parameters using a weighted rank 1 factorization of a matrix based on the confidence weights.

6. The system of claim 1, further comprising a texture recovery module in communication with the three-dimensional structure recovery module for recovering a set of texture parameters for the object based on the set of three-dimensional shape parameters and three-dimensional motion parameters.

7. The system of claim 1, further comprising a three-dimensional shape refinement module in communication with the three-dimensional structure recovery module for generating a refined set of three-dimensional shape parameters.

8. The system of claim 7, wherein the three-dimensional shape refinement module is for generating the refined set of three-dimensional shape parameters using an iterative multiresolution continuation method based on a maximum likelihood estimation technique.

9. The system of claim 7, further comprising a texture recovery module in communication with the three-dimensional structure recovery module and the three-dimensional shape refinement module for recovering a set of texture parameters for the object based on the refined set of three-dimensional shape parameters determined by the three-dimensional shape refinement module and the three-dimensional motion parameters determined by the three-dimensional structure recovery module.

10. A method for generating a three-dimensional model of an object from a two-dimensional image sequence, comprising:
    capturing a sequence of images of a scene, the scene including the object;
    determining a plurality of two-dimensional motion parameters for the object from the sequence of images; and
    estimating a set of three-dimensional shape parameters and a set of three-dimensional motion parameters from the two-dimensional motion parameters using a rank 1 factorization of a matrix.

11. The method of claim 10, wherein capturing includes capturing a sequence of digitized images of the scene.

12. The method of claim 10, wherein capturing includes capturing a sequence of analog images of the scene, and further comprising digitizing the analog images prior to determining the plurality of two-dimensional motion parameters.

13. The method of claim 10, wherein:
    determining includes determining a plurality of two-dimensional motion parameters from the digitized image sequence for each of a plurality of surface patches of the object; and
    estimating a set of three-dimensional shape parameters includes estimating a set of three-dimensional shape parameters for each of the plurality of surface patches from the two-dimensional motion parameters using a rank 1 factorization of a matrix.

14. The method of claim 10, further comprising assigning confidence weights to certain of the two-dimensional motion parameters, and wherein estimating the set of three-dimensional shape parameters and the set of three-dimensional motion parameters includes estimating a set of three-dimensional shape parameters and a set of three-dimensional motion parameters from the two-dimensional motion parameters using a weighted rank 1 factorization of a matrix based on the confidence weights.

15. The method of claim 10, further comprising generating a set of texture parameters for the object based on the set of three-dimensional shape parameters and the set of three-dimensional motion parameters.

16. The method of claim 10, further comprising generating a refined set of three-dimensional shape parameters from the set of three-dimensional shape parameters.

17. The method of claim 10, wherein generating a refined set of three-dimensional shape parameters includes generating the refined set of three-dimensional shape parameters using an iterative multiresolution continuation method based on a maximum likelihood estimation technique.

18. The method of claim 16, further comprising determining a set of texture parameters for the object based on the refined set of three-dimensional shape parameters.

19. A method for generating a three-dimensional model of an object from a sequence of digitized images of a scene, the scene including the object, comprising:
  determining a plurality two-dimensional motion parameters for the object from the sequence of digitized images of the scene; and
  estimating a set of three-dimensional shape parameters and a set of three-dimensional motion parameters from the two-dimensional motion parameters using a rank 1 factorization of a matrix.

20. The method of claim 19, wherein:
  determining includes determining a plurality of two-dimensional motion parameters from the digitized image sequence for each of a plurality of surface patches of the object; and
  estimating a set of three-dimensional shape parameters includes estimating a set of three-dimensional shape parameters for each of the plurality of surface patches from the two-dimensional motion parameters using a rank 1 factorization of a matrix.

21. The method of claim 19, further comprising assigning confidence weights to certain of the two-dimensional motion parameters, and where estimating the set of three-dimensional shape parameters and the set of three-dimensional motion parameters includes estimating a set of three-dimensional shape parameters and a set of three-dimensional motion parameters from the two-dimensional motion parameters using a weighted rank 1 factorization of a matrix based on the confidence weights.

22. The method of claim 19, further comprising generating a set of texture parameters for the object based on the set of three-dimensional shape parameters and the set of three-dimensional motion parameters.

23. The method of claim 19, further comprising generating a refined set of three-dimensional shape parameters from the set of three-dimensional shape parameters.

24. A device for generating a three-dimensional model of an object from a sequence of digitized images of a scene, the scene including the object, comprising:
  a two-dimensional motion filter module for determining a plurality two-dimensional motion parameters for the object from the sequence of digitized images; and
  a three-dimensional structure recovery module in communication with the two-dimensional motion filter module for estimating a set of three-dimensional shape parameters and a set of three-dimensional motion parameters from the two-dimensional motion parameters using a rank 1 factorization of a matrix.

25. The device of claim 24, wherein:
  the two-dimensional motion filter module is for determining a plurality of two-dimensional motion parameters for each of a plurality of surface patches of the object; and
  the three-dimensional structure recovery module is for estimating the set of three-dimensional shape parameters from the set of two-dimensional motion parameters for each of the plurality of surface patches of the object using a rank 1 factorization of a matrix.

26. The device of claim 24, wherein:
  the two-dimensional motion filter module is further for assigning confidence weights to certain of the two-dimensional motion parameters; and
  the three-dimensional structure recovery module is for estimating the set of three-dimensional shape parameters and the set of three-dimensional motion parameters from the two-dimensional motion parameters using a weighted rank 1 factorization of a matrix based on the confidence weights.

27. The device of claim 24, further comprising a texture recovery module in communication with the three-dimensional structure recovery module for recovering a set of texture parameters for the object based on the set of three-dimensional shape parameters and three-dimensional motion parameters.

28. The device of claim 24, further comprising a three-dimensional shape refinement module in communication with the three-dimensional structure recovery module for generating a refined set of three-dimensional shape parameters.

29. A device for generating a three-dimensional model of an object from a sequence of digitized images of a scene, the scene including the object, comprising:
  means for determining a plurality two-dimensional motion parameters for the object from the sequence of digitized images of the scene; and
  means for estimating a set of three-dimensional shape parameters and a set of three-dimensional motion parameters from the two-dimensional motion parameters using a rank 1 factorization of a matrix.

30. The device of claim 29, wherein:
  the means for determining includes means for determining a plurality of two-dimensional motion parameters for each of a plurality of surface patches of the object; and
  the means for estimating the set of three-dimensional shape parameters and the set of three-dimensional motion parameters includes means for estimating the set of three-dimensional shape parameters from the two-dimensional motion parameters for each of the plurality of surface patches of the object using a rank 1 factorization of a matrix.

31. The device of claim 29, further comprising means for assigning confidence weights to certain of the two-dimensional motion parameters, and wherein the means for estimating the set of three-dimensional shape parameters and the set of three-dimensional motion parameters includes means for estimating the set of three-dimensional shape parameters and the set of three-dimensional motion parameters from the two-dimensional motion parameters using a weighted rank 1 factorization of a matrix based on the confidence weights.

32. The device of claim 29, further comprising means for recovering a set of texture parameters for the object based on the set of three-dimensional shape parameters and three-dimensional motion parameters.

33. The device of claim 29, further comprising means for generating a refined set of three-dimensional shape parameters.

34. A computer-readable medium, having stored thereon instructions, which when executed by a processor, cause the processor to:
  determine a plurality of two-dimensional motion parameters for an object from a sequence of digitized images of a scene, wherein the scene includes the object; and estimate a set of three-dimensional shape parameters and a set of three-dimensional motion parameters from the two-dimensional motion parameters using a rank 1 factorization of a matrix.

35. The computer-readable medium of claim 34, having further stored thereon instructions, which when executed by the processor, cause the processor to:
   determine a plurality of two-dimensional motion parameters from the digitized image sequence for each of a plurality of surface patches of the object; and
   estimate a set of three-dimensional shape parameters for each of the plurality of surface patches from the two-dimensional motion parameters using a rank 1 factorization of a matrix.

36. The computer-readable medium of claim 34, having further stored thereon instructions, which when executed by the processor, cause the processor to:
   assign confidence weights to certain of the two-dimensional motion parameters; and
   estimate a set of three-dimensional shape parameters and a set of three-dimensional motion parameters from the two-dimensional motion parameters using a weighted rank 1 factorization of a matrix based on the confidence weights.

37. The computer-readable medium of claim 34, having further stored thereon instructions, which when executed by the processor, cause the processor to generate a set of texture parameters for the object based on the set of three-dimensional shape parameters and the set of three-dimensional motion parameters.

38. The computer-readable medium of claim 34, having further stored thereon instructions, which when executed by the processor, cause the processor to generate a refined set of three-dimensional shape parameters from the set of three-dimensional shape parameters.

39. A computer-readable medium, having stored thereon instructions, which when executed by a processor, cause the processor to:
   generate a matrix of two-dimensional motion parameters, wherein the two-dimensional motion parameters describe motion of an object in an image sequence; and
   estimate a set of three-dimensional shape parameters and a set of three-dimensional motion parameters for the object from the two-dimensional motion parameters using a rank 1 factorization of the matrix.

40. The computer-readable medium of claim 39, having further stored thereon instructions, which when executed by the processor, cause the processor to:
   assign confidence weights to certain of the two-dimensional motion parameters; and
   estimate the set of three-dimensional shape parameters and the set of three-dimensional motion parameters from the matrix using a weighted rank 1 factorization of the matrix based on the confidence weights.

41. The computer-readable medium of claim 39, having further stored thereon instructions, which when executed by the processor, cause the processor to generate a set of texture parameters for the object based on the set of three-dimensional shape parameters and the set of three-dimensional motion parameters.

42. The computer-readable medium of claim 39, having further stored thereon instructions, which when executed by the processor, cause the processor to generate a refined set of three-dimensional shape parameters from the set of three-dimensional shape parameters.

43. A three-dimensional structure recovery module, comprising:
   means for generating a matrix of two-dimensional motion parameters, wherein the two-dimensional motion parameters describe motion of an object in an image sequence; and
   means for estimating a set of three-dimensional shape parameters and a set of three-dimensional motion parameters for the object from the two-dimensional motion parameters using a rank 1 factorization of the matrix.

44. The three-dimensional recovery module of claim 43, wherein certain of the two-dimensional motion parameters have confidence weights assigned thereto, and wherein the means for estimating a set of three-dimensional shape parameters and a set of three-dimensional motion parameters includes means for estimating a set of three-dimensional shape parameters and a set of three-dimensional motion parameters from the two-dimensional motion parameters using a weighted rank 1 factorization of the matrix based on the confidence weights.

45. A method for generating a three-dimensional model of an object from a two-dimensional image sequence of a scene including the object, wherein the object includes at least one occlusion, comprising:
   generating a matrix of two-dimensional motion parameters for the object from the sequence of images;
   generating an initial estimate of a set three-dimensional shape parameters and a set of three-dimensional motion parameters for the object based a submatrix of the matrix of two-dimensional motion parameters, wherein the submatrix includes no missing elements; and
   iteratively re-estimating the set three-dimensional shape parameters and the set of three-dimensional motion parameters based the initial estimate to generate a final estimate of the set three-dimensional shape parameters and a set of three-dimensional motion parameters for the object.

46. The method of claim 45, wherein generating an initial estimate includes generating an initial estimate of the set three-dimensional shape parameters and the set of three-dimensional motion parameters of the object using a rank 1 factorization of the submatrix.

47. The method of claim 45, wherein iteratively re-estimating includes:
   computing unknown three-dimensional shape parameters for the object based on known three-dimensional motion parameters; and
   computing unknown three-dimensional motion parameters for the object based on known three-dimensional shape parameters.

48. A device for generating a three-dimensional model of an object from a sequence of digitized images of a scene including the object, wherein the object includes at least one occlusion, comprising:
   a two-dimensional motion filter module for determining a plurality two-dimensional motion parameters for the object from the sequence of digitized images; and
   a three-dimensional structure recovery module in communication with the two-dimensional motion filter module for:
      generating a matrix of two-dimensional motion parameters for the object from the sequence of images;
      generating an initial estimate of a set three-dimensional shape parameters and a set of three-dimensional motion parameters for the object based on a submatrix of the matrix of two-dimensional motion parameters, wherein the submatrix includes no missing elements; and iteratively re-estimating the set three-dimensional shape parameters and the set of three-dimensional motion parameters based the initial estimate to generate a final estimate of the set three-dimensional shape parameters and a set of three-dimensional motion parameters for the object.

49. The device of claim 48, wherein the three-dimensional structure recovery module is for generating an initial estimate of a set three-dimensional shape parameters and a set of three-dimensional motion parameters using a rank 1 factorization of the submatrix.

50. A communications network, comprising:

a two-dimensional motion filter module for determining a plurality two-dimensional motion parameters for an object from a sequence of digitized images of a scene including the object;

a three-dimensional structure recovery module in communication with the two-dimensional motion filter module for estimating a set of three-dimensional shape parameters and a set of three-dimensional motion parameters for the object from the two-dimensional motion parameters using a rank 1 factorization of a matrix; and an end-user terminal in communication with the three-dimensional structure recovery module.

51. The communications network of claim 50, wherein the end-user terminal is in communication with the three-dimensional structure recovery module via an IP-based network.

52. The communications network of claim 50, wherein the end-user terminal is in communication with the three-dimensional structure recovery module via at least one of a wireless communications link and a wireline communications link.

* * * * *